(12) United States Patent  
Fujimoto et al.

(10) Patent No.: US 8,549,964 B2
(45) Date of Patent: Oct. 8, 2013

(54) MACHINE TOOL FOR TURNING OPERATIONS

(75) Inventors: Koji Fujimoto, Nara (JP); Kento Komine, Nara (JP); Tsutomu Tokuma, Nara (JP); Yutaka Nishimura, Nara (JP)

(73) Assignee: Mori Seiki Co., Ltd., Yamatokoriyama-shi (JP)

(*) Notice: Subject to any disclaimer, the term of this patent is extended or adjusted under 35 U.S.C. 154(b) by 555 days.

(21) Appl. No.: 12/769,994

(22) Filed: Apr. 29, 2010

(65) Prior Publication Data

US 2010/0282037 A1 Nov. 11, 2010

(30) Foreign Application Priority Data

May 8, 2009 (JP) ................... 2009-114035

(51) Int. Cl.
*B23B 13/02* (2006.01)
(52) U.S. Cl.
USPC ............ 82/124; 82/121; 82/129; 82/148
(58) Field of Classification Search
USPC ............ 82/121, 124, 125, 129, 148; 29/27 C, 29/26 A
IPC ............ B23B 3/18,3/34, 13/10, 13/02, 13/04
See application file for complete search history.

(56) References Cited

U.S. PATENT DOCUMENTS

| | | | | |
|---|---|---|---|---|
| 2,877,676 | A * | 3/1959 | Swanson et al. | 82/125 |
| 4,019,410 | A * | 4/1977 | Staszkiewicz | 82/124 |
| 5,309,368 | A * | 5/1994 | Chern | 700/179 |
| 5,514,061 | A | 5/1996 | Ito | |
| 5,758,554 | A * | 6/1998 | Miyano | 82/1.11 |
| 7,631,407 | B2 * | 12/2009 | Feinauer et al. | 29/27 R |
| 7,637,856 | B2 * | 12/2009 | Kawai et al. | 483/20 |
| 8,074,543 | B2 * | 12/2011 | Hyatt et al. | 82/121 |
| 2002/0014139 | A1 | 2/2002 | Hirose et al. | |
| 2002/0053268 | A1 * | 5/2002 | Ueda et al. | 82/129 |
| 2003/0177623 | A1 * | 9/2003 | Geissler et al. | 29/27 C |
| 2004/0173063 | A1 * | 9/2004 | Trautmann | 82/124 |

(Continued)

FOREIGN PATENT DOCUMENTS

JP 5-57506 3/1993
JP H0740112 2/1995

(Continued)

OTHER PUBLICATIONS

Japanese Office Action mailed May 7, 2013 in counterpart application No. 2009-114035 with English translation (7 pages).

*Primary Examiner* — Daniel Howell
*Assistant Examiner* — Ryan Rufo
(74) *Attorney, Agent, or Firm* — Kratz, Quintos & Hanson, LLP

(57) ABSTRACT

A multi-axis turning center for turning operations includes a machine body, a tool rest means for holding a tool, a first headstock for holding a workpiece, and a second headstock disposed in confronting relation to the first headstock, for holding a workpiece. The second headstock has a front chuck and a rear chuck for gripping respective workpieces. The second headstock performs a workpiece changing function by swiveling about a central axis. The multi-axis turning center is capable of automatically changing the workpieces by itself while it is carrying out a machining process, without the need for a workpiece changer. The multi-axis turning center does not need to stop its machining process for changing workpieces, resulting in an increase in the utilization ratio thereof.

6 Claims, 19 Drawing Sheets

(56) References Cited

U.S. PATENT DOCUMENTS

| | | | |
|---|---|---|---|
| 2005/0022350 A1* | 2/2005 | Tokuma et al. | 29/27 C |
| 2005/0198793 A1* | 9/2005 | Ueda | 29/27 C |
| 2006/0218764 A1* | 10/2006 | Hashimoto et al. | 29/27 C |
| 2006/0236514 A1* | 10/2006 | Sasazawa et al. | 29/27 C |
| 2007/0234541 A1* | 10/2007 | Feinauer et al. | 29/27 C |
| 2008/0131224 A1 | 6/2008 | Vouillamoz | |
| 2009/0107310 A1* | 4/2009 | Arisue et al. | 82/120 |

FOREIGN PATENT DOCUMENTS

| | | |
|---|---|---|
| JP | 7-88702 | 4/1995 |
| JP | 2001087901 | 4/2001 |
| JP | 2002059301 | 2/2002 |
| JP | 2006263862 | 10/2006 |
| JP | 2008126372 | 6/2008 |
| WO | 0130522 | 5/2001 |

* cited by examiner

MACHINE TOOL FOR TURNING OPERATIONS

BACKGROUND OF THE INVENTION

1. Field of the Invention

The present invention relates to a machine tool for carrying out at least turning operations, which comprises a first headstock for holding a workpiece and a second headstock, which is disposed in confronting relation to the first headstock, for holding a workpiece.

2. Description of the Related Art

Japanese published patent application No. 5-57506 discloses a machining center for machining bars. The disclosed machining center has a rotating table (corresponding to a first headstock according to the present invention) for gripping a workpiece and another rotating table (corresponding to a second headstock according to the present invention), which is disposed in confronting relation to the first-mentioned rotating table, for gripping a workpiece.

Japanese published patent application No. 7-88702 discloses a method of supplying a workpiece to and ejecting the workpiece from a lathe. According to the disclosed method, a pair of robot hands is disposed one on each side of a hand bracket, and change workpieces on a headstock of the lathe.

In the machining center disclosed in Japanese published patent application No. 5-57506, the other rotating table swivels in a horizontal plane. Japanese published patent application No. 5-57506 is silent as to any way of ejecting a machined workpiece smoothly out of the machining center without causing damage to the workpiece.

According to the method disclosed in Japanese published patent application No. 7-88702, the robot hands grip the workpiece and transfer the workpiece to and from the headstock of the lathe. The lathe itself needs to have a device for supplying and ejecting the workpiece.

General machine tools for performing turning operations according to the related art are mostly devoid of a workpiece changer. When such a machine tool has machined a workpiece, the machine tool stops its machining process and waits for the operator to attend the machine tool. Upon arrival at the machine tool, the operator removes the machined workpiece from the machine tool, and supplies a non-machined workpiece to the machine tool. Thereafter, the machine tool resumes its machining process on the non-machined workpiece which is mounted on its headstock.

Since the general machine tools according to the related art need to stop their machining process for changing workpieces, the utilization ratio of the machine tools tends to be lowered. In addition, it is burdensome for the operator to change the workpieces on the machine tools.

SUMMARY OF THE INVENTION

It is an object of the present invention to provide a machine tool for turning operations which is capable of automatically changing workpieces by itself while the machine tool is carrying out a machining process, so that the machine tool does not need a workpiece changer and is not required to stop the machining process for changing workpieces, thereby increasing the utilization ratio thereof and serving as a labor saver.

Another object of the present invention is to provide a machine tool for turning operations which is capable of ejecting a workpiece which has been successively machined at opposite axial ends thereof, smoothly out of the machine tool by moving the workpiece obliquely downwardly by gravity without causing damage thereto.

To achieve the first-mentioned object, a machine tool for performing at least turning operations according to an aspect of the present invention comprises:

a machine body;

a tool rest means movably mounted on the machine body, for holding a tool;

a first headstock mounted on the machine body, for holding a workpiece rotatably thereon; and a second headstock movably mounted on the machine body in confronting relation to the first headstock, for holding a workpiece rotatably thereon;

wherein the second headstock has a front chuck, disposed on a front side of a central axis thereof for detachably gripping the workpiece, and a rear chuck disposed on a rear side of the central axis thereof for detachably gripping the workpiece, and the second headstock performs a workpiece changing function by swiveling about a central axis extending parallel to a Y-axis direction.

Preferably, the machine tool may comprise a multi-axis turning center, and the tool rest means comprises a first tool rest having a turret with a plurality of tools mounted thereon for machining the workpiece, and a second tool rest with a tool detachably mounted on a tool spindle, for machining the workpiece.

Alternatively, the machine tool may comprise a lathe, and the tool rest means comprises one or more tool rests having a turret with a plurality of tools mounted thereon, for machining the workpiece.

Preferably, the machine tool further comprises: a workpiece transfer unit for changing a machined workpiece with a non-machined workpiece on the second headstock; wherein the workpiece transfer unit supplies the non-machined workpiece to a workpiece change position which is outside of a machining area, and removes the machined workpiece ejected to the workpiece change position; and the second headstock grips the non-machined workpiece supplied to the workpiece change position and thereafter places the machined workpiece in the workpiece change position.

A machine tool for performing at least turning operations according to another aspect of the present invention comprises:

a machine body;

a tool rest means movably mounted on the machine body, for holding a tool;

a first headstock mounted on the machine body, for holding a workpiece rotatably thereon; and a second headstock movably mounted on the machine body in confronting relation to the first headstock, for holding a workpiece rotatably thereon;

wherein the machine tool comprises a multi-axis turning center;

the tool rest means comprises a first tool rest having a turret with a plurality of tools mounted thereon for machining the workpiece, and a second tool rest with the tool detachably mounted on a tool spindle, for machining the workpiece; and the second headstock is capable of swiveling about a central axis extending parallel to a Y-axis direction.

Preferably, while the workpiece is being machined by the first headstock and the first tool rest, a front chuck of the second headstock and the tool spindle of the second tool rest are oriented obliquely out of physical interference with at least one of the first headstock, the first tool rest and the workpiece, and another workpiece is machined by the second headstock and the second tool rest.

A machine tool for performing at least turning operations according to another aspect of the present invention comprises:

a machine body;

a tool rest means movably mounted on the machine body, for holding tools;

a first headstock mounted on the machine body, for holding a workpiece rotatably thereon; and a second headstock movably mounted on the machine body in confronting relation to the first headstock, for holding a workpiece rotatably thereon;

wherein the machine tool comprises a lathe;

the tool rest means comprises a first tool rest having a turret with a plurality of tools mounted thereon for machining the workpiece; and the second headstock is capable of swiveling about a central axis which extends parallel to a Y-axis direction.

The machine tool for performing at least turning operations according to the first-mentioned aspect of the present invention, which is constructed as described above, can automatically change the workpieces by itself while the machine tool is carrying out a machining process, so that the machine tool does not need a workpiece changer and is not required to stop the machining process for changing the workpieces. Therefore, the machine tool has a relatively high utilization ratio and serves as a labor saver. If the machine tool is combined with a workpiece transfer unit, then the machine tool can operate as an unattended automatic machine tool.

The machine tool for performing at least turning operations according to the other aspect of the present invention, which is constructed as described above, can eject a workpiece which has been successively machined at opposite axial ends thereof, smoothly out of the machine tool by moving the workpiece obliquely downwardly by gravity without causing damage thereto.

DESCRIPTION OF THE PREFERRED EMBODIMENTS

Figure 1:
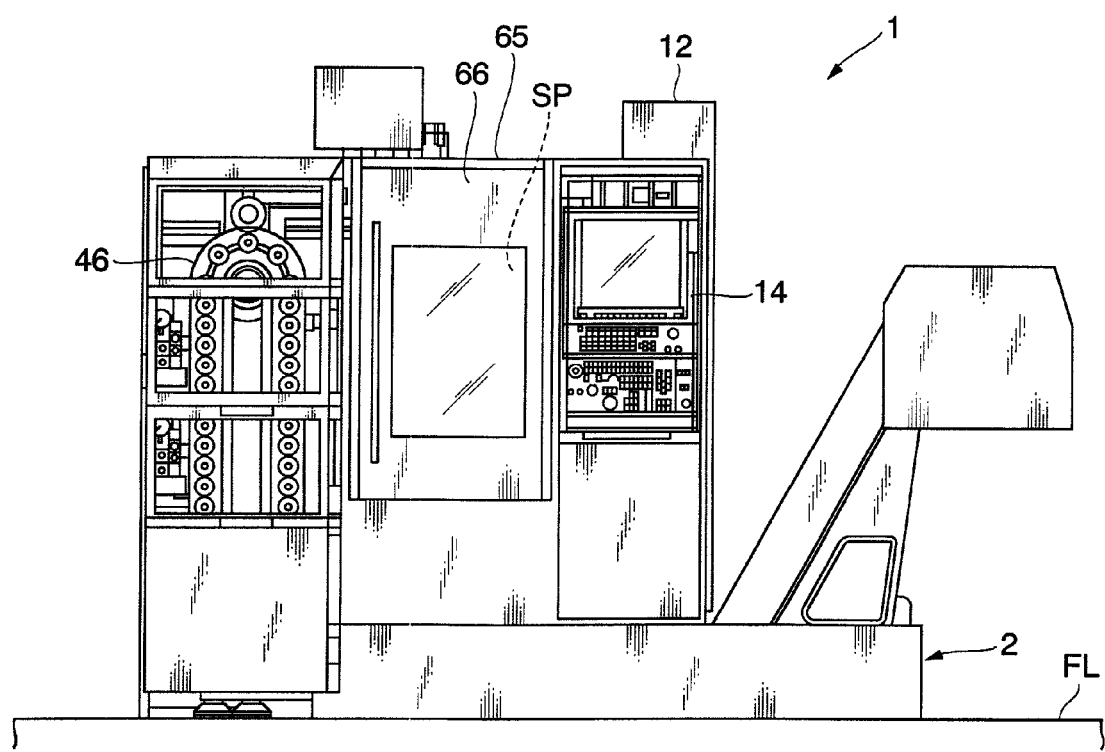
FIG. 1 is a front elevational view of a multi-axis turning center as a machine tool according to a first embodiment of the present invention.

Like or corresponding parts are denoted by like or corresponding reference characters throughout views.

Heretofore, machining centers often have their own automatic workpiece changer because they spend a relatively long time to machine a single workpiece. However, machine tools for performing turning operations, particularly lathes, have nothing to do with the notion of automatic workpiece changing as the time required for them to machine a single workpiece is much shorter.

Recently, as lathes have been required to perform more complex machining operations and more multi-axis turning centers have found widespread use, the lathes and the multi-axis turning centers have a tendency to consume a longer time to machine a single workpiece. The inventors have completed the present invention in view of demands in the art for a technology for automatically changing workpieces on machine tools for performing turning operations, such as multi-axis turning centers and lathes.

A machine tool for performing at least turning operations according to an aspect of the present invention comprises a tool rest means for holding a tool, a first headstock for holding a workpiece, and a second headstock, which is disposed in confronting relation to the first headstock, for holding a workpiece.

The second headstock has a front chuck, disposed on a front side thereof along an axis thereof for detachably gripping the workpiece, and a rear chuck disposed on a rear side thereof along the axis thereof for detachably gripping the workpiece. The second headstock can perform a workpiece changing function by swiveling about a central axis parallel to a Y-axis direction.

The machine tool thus constructed is capable of automatically changing workpieces by itself while the machine tool is carrying out a machining process, without the need for a workpiece changer. As a consequence, the machine tool does not need to stop its machining process for changing the workpieces, so that the utilization ratio of the machine tool is increased and the machine tool itself serves as a labor saver. If the machine tool is combined with a workpiece transfer unit, then the machine tool can operate as an unattended automatic machine tool.

A machine tool for performing at least turning operations according to an aspect of the present invention is a multi-axis turning center which comprises a tool rest means for holding a tool, a first headstock for holding a workpiece, and a second headstock, which is disposed in confronting relation to the first headstock, for holding a workpiece. The tool rest means comprises a first tool rest having a turret with a plurality of tools mounted thereon for machining the workpiece, and a second tool rest with the tool detachably mounted on a tool spindle, for machining the workpiece. The second headstock is capable of swiveling about a central axis parallel to a Y-axis direction.

If the machine tool is a lathe, then the lathe comprises a tool rest means for holding a tool, a first headstock for holding a workpiece, and a second headstock, which is disposed in confronting relation to the first headstock, for holding a workpiece. The tool rest means comprises a first tool rest having a turret with a plurality of tools mounted thereon for machining the workpiece. The second headstock is capable of swiveling about a central axis parallel to a Y-axis direction.

After the machine tool has successively machined the workpiece at opposite axial ends thereof, the machine tool ejects the workpiece smoothly by moving the workpiece obliquely downwardly by gravity without causing damage thereto.

According to embodiments and modifications shown in FIGS. 1 through 16, machine tools comprise multi-axis turning centers and lathes, and carry out at least turning operations.

A first embodiment of the present invention and a modification thereof, and a second embodiment of the present invention and modifications thereof will successively be described below.

First Embodiment

Figure 2:
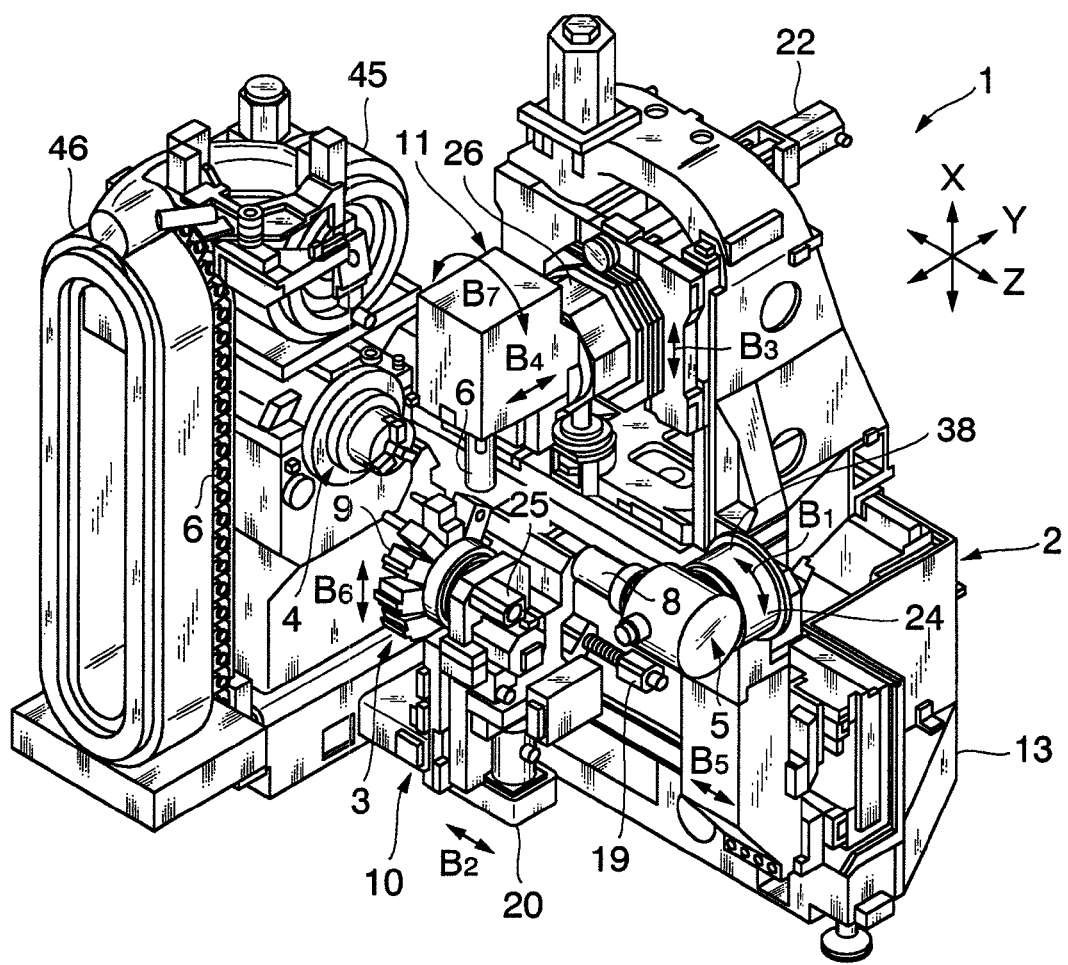
FIG. 2 is a perspective view of the multi-axis turning center shown in FIG. 1.
Figure 3:
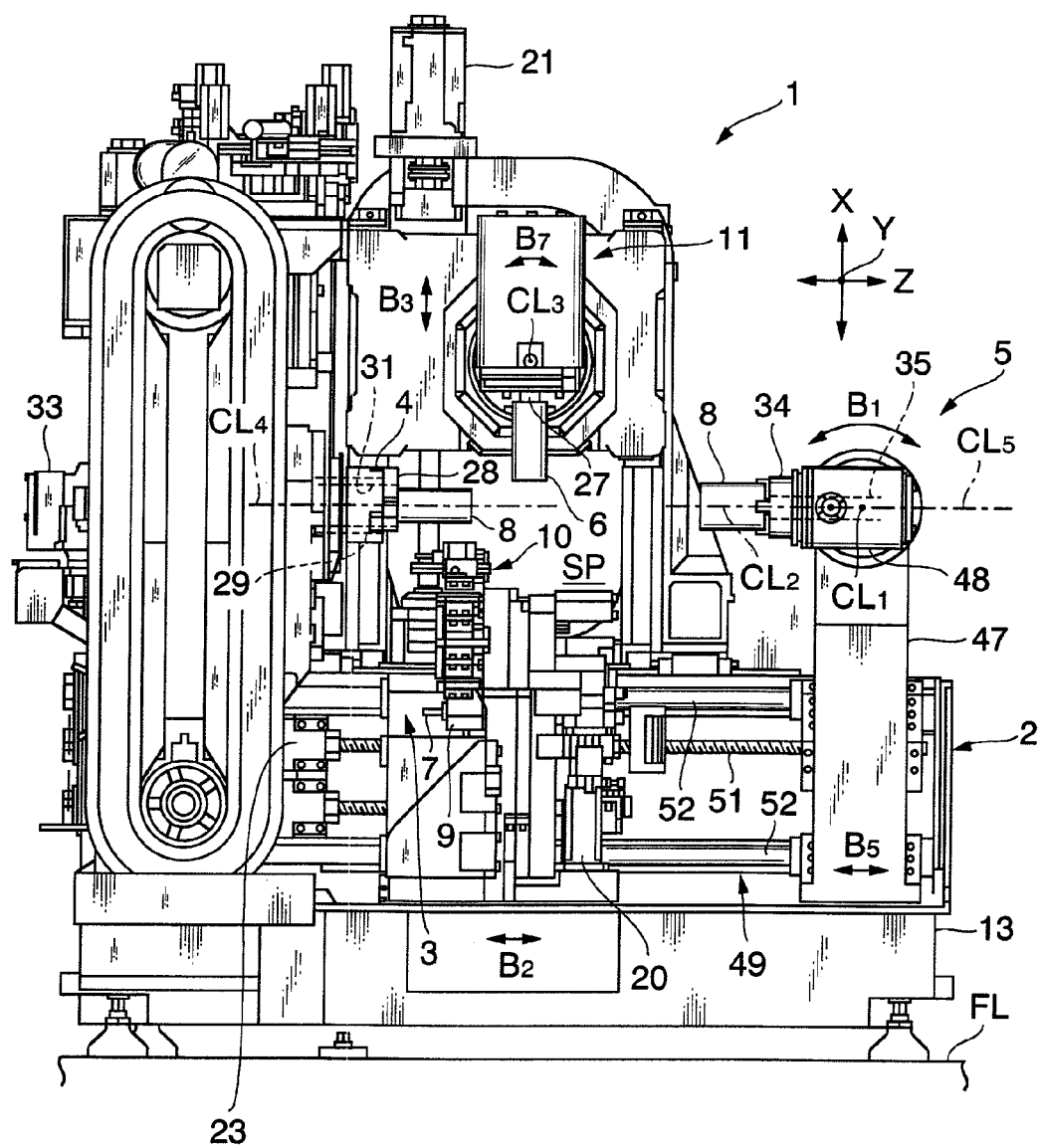
FIG. 3 is a front elevational view of the multi-axis turning center shown in FIG. 1.
Figure 4:
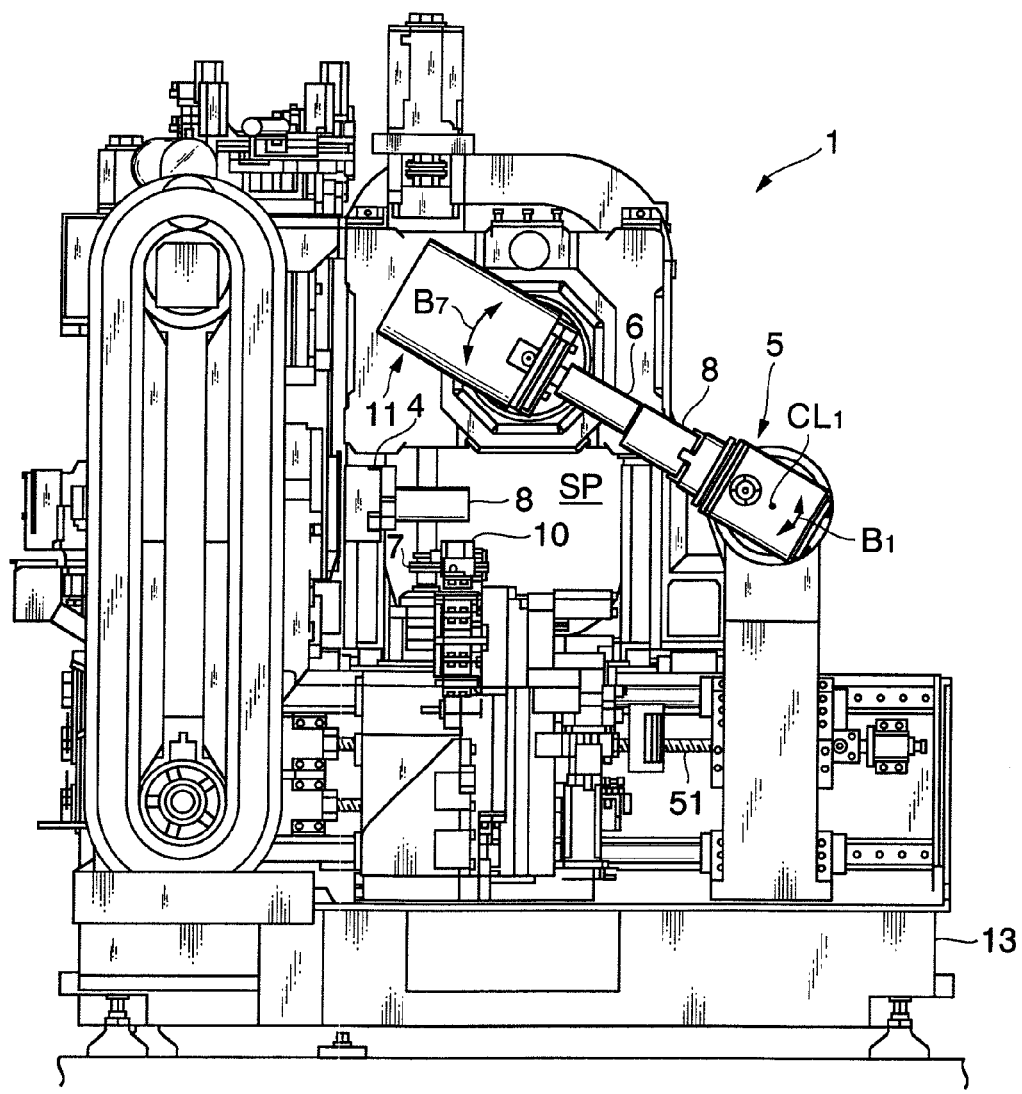
FIG. 4 is a front elevational view of the multi-axis turning center shown in FIG. 1, showing the manner in which the multi-axis turning center is machining two workpieces simultaneously.
Figure 5:
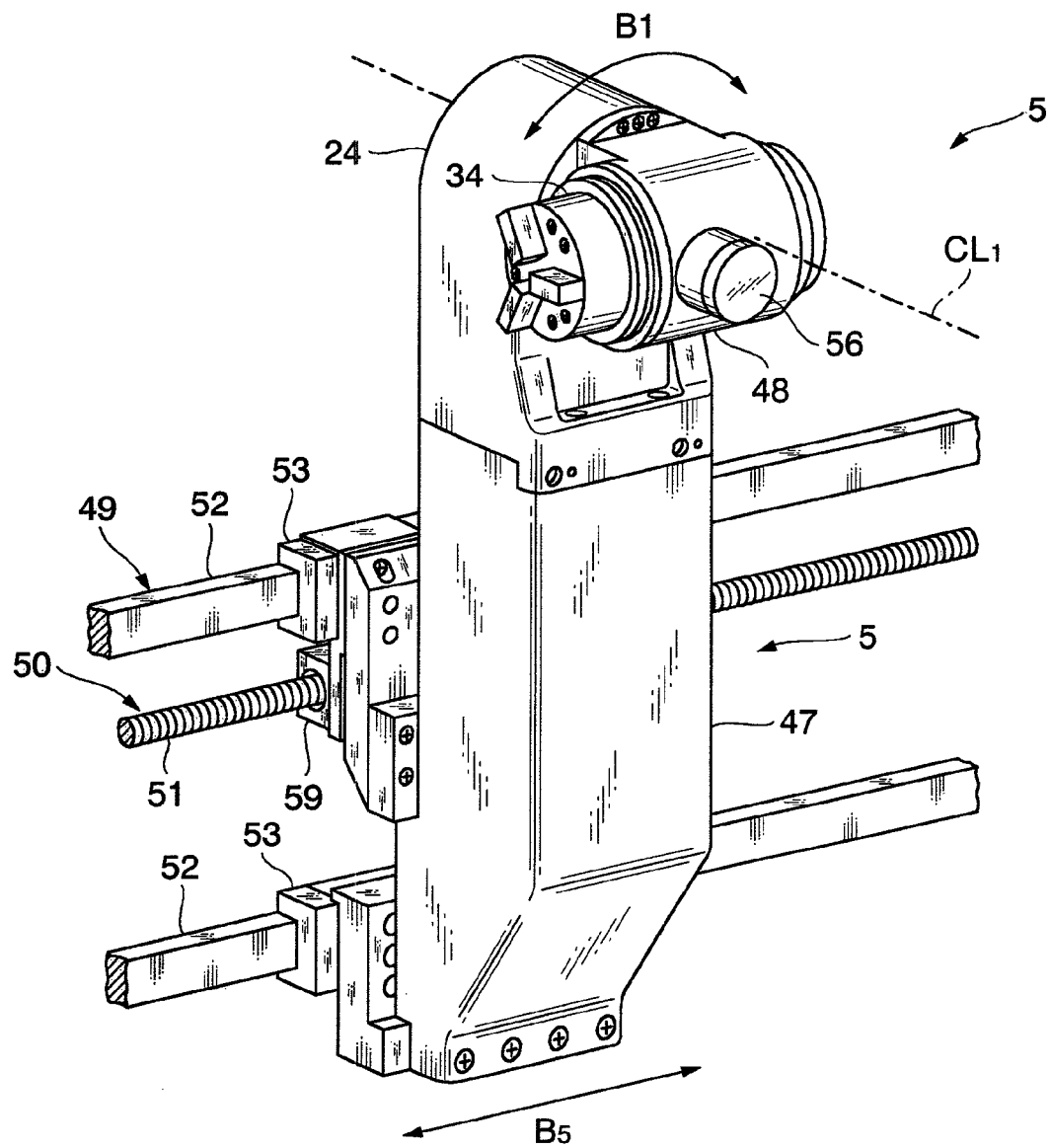
FIG. 5 is a perspective view of a second headstock of the multi-axis turning center shown in FIG. 1.
Figure 6:
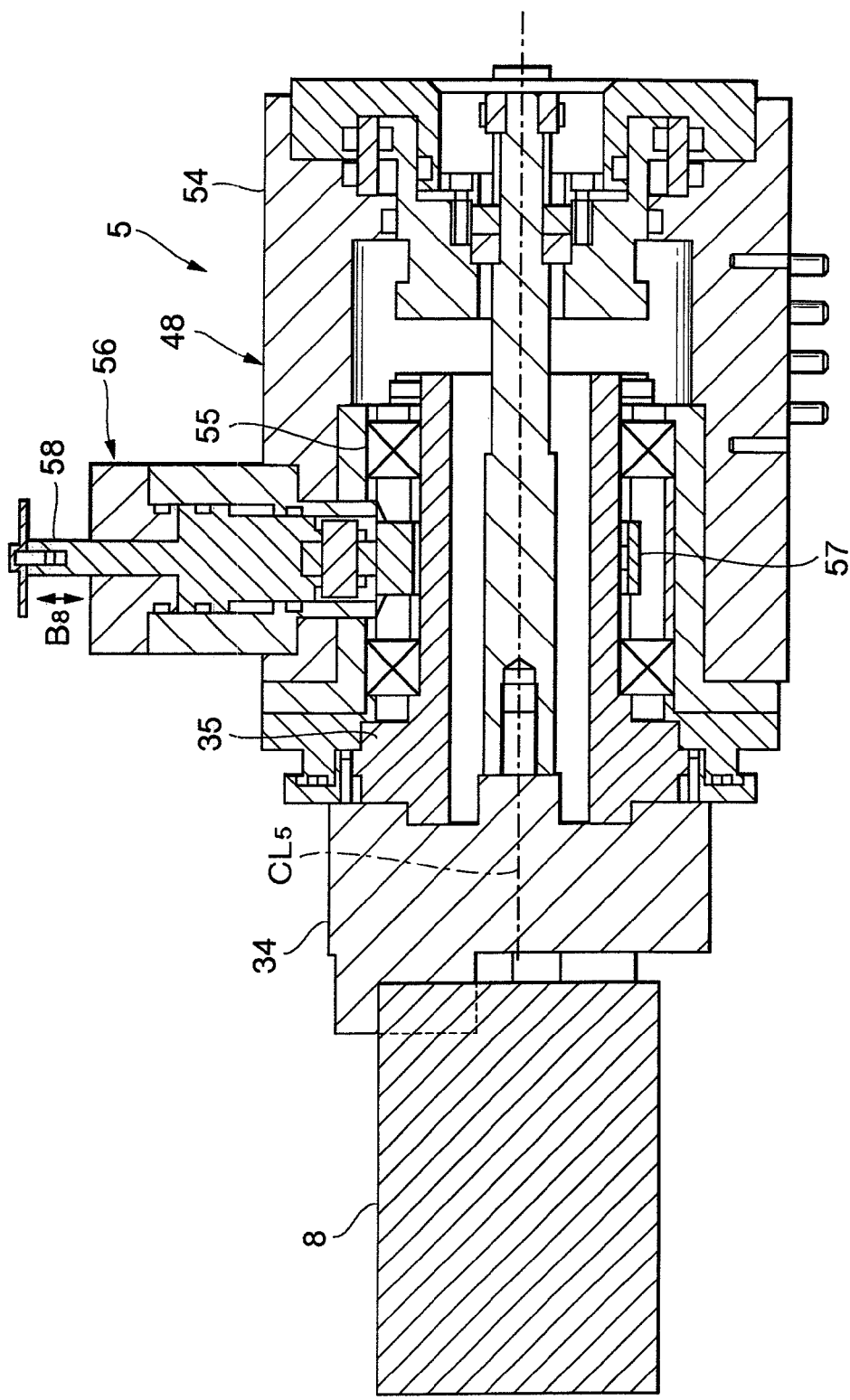
FIG. 6 is a cross-sectional view of the second headstock shown in FIG. 5.

FIGS. 1 through 8D show a first embodiment of the present invention and a modification thereof. FIG. 1 is a front elevational view of a multi-axis turning center as a machine tool according to a first embodiment of the present invention, FIGS. 2 and 3 are perspective and front elevational views, respectively, of the multi-axis turning center shown in FIG. 1, FIG. 4 is a front elevational view of the multi-axis turning center shown in FIG. 1, showing the manner in which the multi-axis turning center is machining two workpieces simultaneously, FIGS. 5 and 6 are perspective and cross-sectional views, respectively, of a second headstock of the multi-axis turning center shown in FIG. 1, and FIGS. 7A through 7D are front elevational views showing a procedure from machining both ends of a workpiece with the multi-axis turning center shown in FIG. 1 to ejecting the workpiece from the multi-axis turning center.

As shown in FIGS. 1 through 6, the machine tool according to the first embodiment of the present invention comprises a multi-axis turning center 1 having a machine body 2, a tool rest means 3, a first headstock 4 and a second headstock 5. The multi-axis turning center 1 performs at least turning operations.

The machine body 2 includes a base 13 mounted on a floor FL. The tool rest means 3 which holds tools, e.g., tools 6, 7, is movably mounted on the machine body 2.

The tool rest means 3 comprises a first tool rest 10 having a turret 9 with a plurality of tools 7 mounted thereon for machining a workpiece, and a second tool rest 11 with a tool 6 detachably mounted on a tool spindle 27, for machining a workpiece.

The first headstock 4 is mounted on the machine body 2, and a workpiece 8 to be machined is rotatably held by the first headstock 4. Alternatively, the workpiece 8 may be gripped by a first chuck 28 and may be indexed to a certain angular position and may be nonrotatably held in the angular position by the first headstock 4.

The second headstock 5 is movably mounted on the machine body 2 in confronting relation to the first headstock 4. The workpiece 8 is rotatably held by the second headstock 5. The second headstock 5 is capable of swiveling, in the direction indicated by the arrow B1, about a central axis CL1 which extends parallel to a Y-axis direction, i.e., which extends horizontally. Alternatively, the central axis CL1 may extend obliquely to the Y-axis direction.

The multi-axis turning center 1 machines the workpiece 8 successively at opposite axial ends thereof which are spaced apart from each other along an axis CL2 of the workpiece 8, with the tools on the first and second tool rests 10, 11, respectively, and subsequently displaces the machined workpiece 8 obliquely downwardly by gravity without causing damage thereto.

Specifically, the multi-axis turning center 1 displaces the machined workpiece 8 obliquely downwardly by gravity at an angle θ (see FIG. 7D) from the horizontal direction, thereby ejecting the machined workpiece 8 smoothly out of the multi-axis turning center 1 without causing damage thereto.

As described above, the first tool rest 10 has the turret 9 with a plurality of tools 7, e.g., turning tools, mounted thereon for machining a workpiece 8, e.g., for performing a turning operation on the workpiece 8. The second tool rest 11 has a tool 6, e.g., a rotating tool, detachably mounted on the tool spindle 27 for machining a workpiece 8, e.g., for performing a cutting operation on the workpiece 8.

The multi-axis turning center 1 can machine two workpieces 8 simultaneously. Specifically, while a workpiece 8 held by the first headstock 4 is being turned by the tool 7 on the first tool rest 10, a workpiece 8 held by the second headstock 5 is cut by the tool 6 on the second tool rest 11.

When the multi-axis turning center 1 is seen in front elevation, vertical direction thereof will be referred to as "X-axis direction", anteroposterior direction (front-back direction) thereof as "Y-axis direction", and horizontal direction as "Z-axis direction".

The multi-axis turning center 1 is controlled by a controller including an NC (Numerical Control) device and a PLC (Programmable Logic Controller). The controller has a control console 12 which is disposed at a predetermined position in the multi-axis turning center 1 and which includes a control panel 14 (see FIG. 1).

The first tool rest 10 having the turret 9 is movable by a first tool rest actuator 19 in the horizontal direction, i.e., the Z-axis direction, indicated by the arrow B2. The turret 9 is movable by a turret X-axis actuator 20 in the vertical direction, i.e., the X-axis direction, indicated by the arrow B6. The turret 9 is angularly movable by a swiveling actuator 25 to index a desired tool 7 to an index position.

The second tool rest 11 is movable by a second tool rest X-axis actuator 21 in the vertical direction, i.e., the X-axis direction, indicated by the arrow B3. The second tool rest 11 is also movable by a second tool rest Y-axis actuator 22 in the anteroposterior direction, i.e., the Y-axis direction, indicated by the arrow B4. The second tool rest 11 is supported on the base 13 of the machine body 2 for movement in the horizontal direction, i.e., the Z-axis direction.

Thus, the second tool rest 11 is movable in three mutually transverse axes directions, i.e., the X-axis direction, the Y-axis direction and the Z-axis direction, with respect to a workpiece 8 which is supported on one of the first headstock 4 and the second headstock 5 or workpieces 8 which are supported respectively on the first headstock 4 and the second headstock 5. The tool 6 held by the second tool rest 11 performs a cutting operation or a turning operation on the workpiece 8 or the workpieces 8.

The second tool rest 11 is angularly movable by a tool rest actuator 26 about a central axis CL3 indicated by the arrow B7 to index the tool 6 to a desired index position. The central axis CL3 extends horizontally in the anteroposterior direction, i.e., the Y-axis direction. The second tool rest 11 has the tool spindle 27 on which the tool 6 is detachably mounted.

The tool 6 which is mounted on the tool spindle 27 is rotatable about its own axis. The second tool rest 11 includes a clamping and unclamping mechanism, not shown, for clamping and unclamping the tool 6 which is mounted on the tool spindle 27.

The tool 6 which is detachably mounted on the tool spindle 27 is rotated about its own axis to perform a cutting operation on a workpiece 8. However, a nonrotatable turning tool 6 may be detachably mounted on the tool spindle 27 to perform a turning operation on a workpiece 8. In other words, the tool 6 is rotatably supported on the second tool rest 11 for performing the cutting operation on a workpiece 8, and is nonrotatably supported on the second tool rest 11 for performing the turning operation on a workpiece 8.

A first spindle 29 is rotatably supported in the first headstock 4. The first headstock 4 with the first spindle 29 rotatably supported therein is disposed on a left side of the base 13 when the base 13 is seen in front elevation. The first chuck 28 is detachably mounted on the distal end of the first spindle 29.

The first spindle 29 is rotatable about its own axis by a rotary actuator 33. The first spindle 29 and the first chuck 28 have a through hole 31, defined centrally axially therein, for inserting a bar workpiece 30 (see FIG. 7A).

The workpiece 8 is gripped by the first chuck 28 and is rotatable about a central axis CL4 by the first spindle 29 which is actuated by the rotary actuator 33. For cutting the workpiece 8 with a rotating tool 6 on the second tool rest 11, the first headstock 4 is controlled to actuate the first spindle 29 to angularly move the workpiece 8 to index the workpiece 8 through a desired angle into a desired index position.

The second headstock 5 is disposed on a right side of the base 13 in confronting relation to the first headstock 4 when the base 13 is seen in front elevation. The second headstock 5 is movable by a second headstock actuator 23 in the horizontal direction, i.e., the Z-axis direction, indicated by the arrow B5.

The second headstock 5 is angularly movable by a swiveling actuator 24 through a desired angle about the central axis CL1 as indicated by the arrow B1. Since the central axis CL1 extends in the anteroposterior direction, i.e., parallel to the Y-axis direction, the second headstock 5 is angularly movable in a vertical plane containing X- and Z-axes.

The central axis CL1 may extend obliquely to the horizontal direction. If the central axis CL1 extends obliquely to the horizontal direction, then the second headstock 5 is angularly movable in an oblique plane.

The second headstock 5 includes a swivel unit 48 in which a second spindle 35 is rotatably supported. The swivel unit 48 is angularly movable about the central axis CL1. A second chuck 34 is detachably mounted on the distal end of the second spindle 35. A workpiece 8 is detachably gripped by the second chuck 34. The second chuck 34 is actuated by a second chuck actuator 38 of the second headstock 5 for selectively gripping and releasing the workpiece 8.

The workpiece 8 which is gripped by the second chuck 34 is rotatable about a central axis CL5 by the second spindle 35. The second spindle 35 is not actuated by an actuator, but is freely reversibly rotatable about the central axis CL5. However, the second spindle 35 can be indexed to a desired angular position and kept nonrotatably in the desired angular position.

The central axis CL5, about which the second spindle 35 is rotatable, and the central axis CL1, about which the swivel unit 48 is angularly movable and which extends parallel to the anteroposterior direction (the Y-axis direction), extend perpendicularly to each other. Consequently, the rotation of the second spindle 35 and the swiveling movement of the swiveling unit 48 are stabilized.

Though no actuator is provided to rotate the second spindle 35 of the second headstock 5 in the present embodiment, the second headstock 5 should preferably have an actuator for rotating the second spindle 35. If the second headstock 5 has an actuator for rotating the second spindle 35, then the workpiece 8 gripped by the second headstock 5 can be rotated to allow one or both of the tools supported on the first tool rest 10 and the second tool rest 11 to perform a turning operation on the workpiece 8.

A workpiece 8 may be gripped by only the first chuck 28 of the first headstock 4 and may be rendered rotatable or nonrotatable. A workpiece 8 may also be gripped by only the second chuck 34 of the second headstock 5 and may be rendered freely rotatable or nonrotatable.

Furthermore, the left end of a workpiece 8 may gripped by the first chuck 28 of the first headstock 4, and the right end of the workpiece 8 may gripped by the second chuck 34 of the second headstock 5. In this case, the workpiece 8 may be rendered rotatable or nonrotatable while its opposite ends are being supported.

The multi-axis turning center 1 has a function as a lathe to cause the tool 7 on the first tool rest 10 to perform a turning operation on the workpiece 8 which is gripped by the first chuck 28 of the first headstock 4.

The multi-axis turning center 1 also has a function as a machining center to cause the tool 6 on the second tool rest 11 to rotate and perform a cutting operation on the workpiece 8 which is nonrotatably gripped by the first chuck 28 of the first headstock 4 or the workpiece 8 which is nonrotatably gripped by the second chuck 34 of the second headstock 5.

The multi-axis turning center 1 includes an ATC (Automatic Tool Changer) 45 and a magazine 46 which are attached to the machine body 2. The ATC 45 and the magazine 46 are disposed on the left side of the base 13. The ATC 45 is disposed above the first headstock 4. The magazine 46 is disposed in front of the first headstock 4.

The magazine 46 is capable of storing a plurality of tools 6. The ATC 45 serves to change the tools 6 between the tool spindle 27 and the magazine 46. The tools 6 such as rotating tools or turning tools which are detachably mounted on the tool spindle 27 of the second tool rest 11 are changed by the ATC 45.

When the multi-axis turning center 1 is used as a machining center, the tool 6 which is detachably mounted on the tool spindle 27 of the second tool rest 11 is rotated about its own axis by the tool spindle 27 and performs a cutting operation on either the workpiece 8 which is nonrotatably gripped by one of the first chuck 28 of the first headstock 4 and the second chuck 34 of the second headstock 5 or the workpiece 8 which is nonrotatably gripped by the first chuck 28 and the second chuck 34, respectively. At this time, the second tool rest 11 performs a function as a spindle head of the machining center.

When the second tool rest 11 performs a turning operation, a turning tool mounted on the tool spindle 27 does not rotate. Rather, the workpiece 8 gripped by the first chuck 28 of the first headstock 4 is rotated, and the turning tool mounted on the tool spindle 27 performs a turning operation on the workpiece 8 thus gripped by the first chuck 28.

The second headstock 5 will be described in greater detail below.

The second headstock 5 is guided by and movable along a linear guide 49 in the horizontal direction, i.e., in the Z-axis direction, by the second headstock actuator 23.

The second headstock 5 includes a main body 47 supported on the base 13 for movement in the horizontal direction, i.e., in the Z-axis direction, and the swivel unit 48 supported on the main body 47 for swiveling movement. A ball screw 50 for moving the second headstock 5 has a screw shaft 51 extending horizontally and disposed on the base 13. The screw shaft 51 is threaded through a ball nut 59 which is fixed to the main body 47.

The second headstock actuator 23, which comprises a servomotor, is mounted on the base 13 and is coupled to an end of the screw shaft 51. When the screw shaft 51 is rotated about its own axis by the second headstock actuator 23, the screw shaft 51 moves the ball nut 59 and hence the second headstock 5 connected thereto along the linear guide 49 in the horizontal direction, i.e., in the Z-axis direction.

The first tool rest 10 is also guided by and is movable along the linear guide 49 in the horizontal direction, i.e., in the Z-axis direction.

The linear guide 49 comprises a pair of vertically spaced guide rails 52 mounted on the base 13. The guide rails 52 extend in the horizontal direction, i.e., in the Z-axis direction, and are attached to the base 13. The second headstock 5 and the first tool rest 10 are horizontally movably supported on the guide rails 52.

A pair of vertically spaced slides 53 is mounted on the main body 47 of the second headstock 5. The slides 53 extend parallel to each other in the horizontal direction, i.e., in the Z-axis direction. The guide rails 52 and the slides 53 which slidingly engage the guide rails 52, respectively, jointly make up the linear guide 49 for guiding the second headstock 5.

The linear guide 49 restrains the second headstock 5 against movement in the anteroposterior direction, i.e., the Y-axis direction, and the vertical direction, i.e., the X-axis direction, thereby performing a function to prevent the second headstock 5 from wobbling, i.e., from oscillating laterally and being lifted.

The swiveling unit 48 can swivel about the central axis CL1 which extends parallel to the Y-axis direction. Specifically, the swiveling unit 48 can swivel in the direction indicated by the arrow B1 about the central axis CL1 which is oriented in the anteroposterior direction, i.e., the Y-axis direction, and which extends horizontally. The swivel unit 48 is angularly movably supported on the main body 47 in an upper front position thereon. The main body 47 houses the swiveling actuator 24 in its upper portion.

The swivel unit 48 has a casing 54, the second spindle 35 reversibly rotatably supported in the casing 54 by bearings 55, and the second chuck 34 detachably mounted on the distal end of the second spindle 35. The second spindle 35 and the second chuck 34 are freely reversibly rotatable about the central axis CL5.

The swivel unit 48 includes a lock means 56 for locking the second spindle 35 against rotation. An eccentric member 57 which is fixed to the second spindle 35 has an outer circumferential surface having a shape, e.g., a heart shape, which is eccentric with respect to the central axis CL5.

The lock means 56 has a presser 58 movable toward and away from the eccentric member 57 in the direction indicated by the arrow B8. When the presser 58 is retracted away from the eccentric member 57, the eccentric member 57 is brought out of contact with the presser 58 and the eccentric member 57 and the second spindle 35 can freely be reversibly rotated.

Conversely, when the presser 58 is pushed into contact with an outer circumferential surface portion of the eccentric member 57 which is closer to the central axis CL5, the eccentric member 57 and the second spindle 35 are locked against rotation. As a result, the workpiece 8 which is gripped by the second chuck 34 is nonrotatably held in position. When the tool 6 on the second tool rest 11 is then rotated, the tool 6 cuts the workpiece 8.

The multi-axis turning center 1 has a machining area SP which is covered with a splash guard 65 for preventing the coolant and chips from being scattered out. The splash guard 65 has a door 66 (see FIG. 1) which can selectively opened and closed.

The splash guard 65 also has a shutter which is selectively openable and closable. When the shutter is opened, it provides an opening for a tool changing arm of the ATC 45 to pass through and to change the tools 6 on the tool spindle 27. When the shutter is closed, the machining area SP is covered with the splash guard 65.

As shown in FIG. 4, while a workpiece 8 is being machined by the first headstock 4 and the first tool rest 10, the second chuck (front chuck) 34 of the second headstock 5 and the tool spindle 27 of the second tool rest 11 are oriented obliquely out of physical interference with at least one of the first headstock 4, the first tool rest 10 and the workpiece 8 which is being machined by the first headstock 4 and the first tool rest 10.

At this time, another workpiece 8 is machined by the second headstock 5 and the second tool rest 11. Consequently, the multi-axis turning center 1 is capable of machining two workpieces 8 simultaneously.

A procedure from machining both ends of a workpiece 8 with the multi-axis turning center 1 to ejecting the workpiece 8 from the multi-axis turning center 1 will be described below with reference to FIGS. 2 through 7D.

Figure 7A:
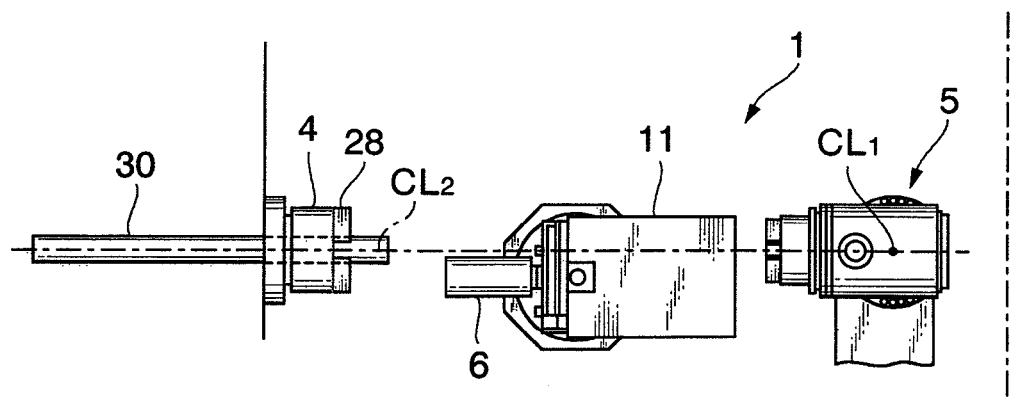
FIGS. 7A through 7D are front elevational views showing a procedure from machining both ends of a workpiece with the multi-axis turning center shown in FIG. 1 to ejecting the workpiece from the multi-axis turning center.

First, the bar workpiece 30 in the form of an elongate blank workpiece is supplied to the first headstock 4. As shown in FIG. 7A, the bar workpiece 30 is moved from the left side of the machine body 2 to the right and is supplied to the first headstock 4 by a bar feeder, not shown, which is combined with the first headstock 4.

The bar workpiece 30 passes through the through hole 31 defined in the first spindle 29 supported in the first headstock 4 and the first chuck 28. An end portion of the bar workpiece 30 which projects from the first spindle 29 is gripped by the first chuck 28.

The first headstock 4 is rendered nonrotatable and the bar workpiece 30 is indexed through a desired angle into a desired index position. The tool 6 on the second tool rest 11 is then rotated to perform a cutting operation on one end, i.e., a front end, of the bar workpiece 30 along the central axis CL2.

Alternatively, the bar workpiece 30 may be rotated by the first spindle 49 of the first headstock 4, and the tool 7 on the first tool rest 10 may perform a turning operation on the front end of the bar workpiece 30.

Figure 7B:
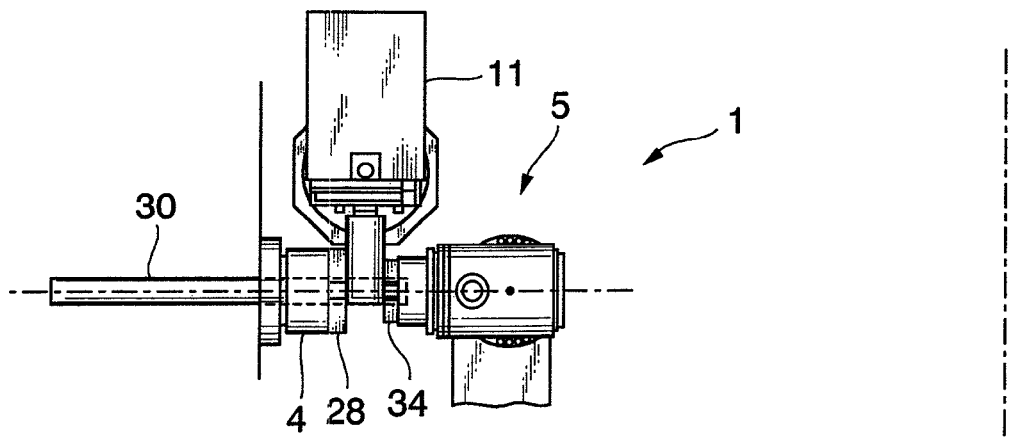

After the one end, i.e., the front end, of the bar workpiece 30 along the central axis CL2 has been machined, the second headstock 5 is moved to the left, as shown in FIG. 7B, and the second chuck 34 grips the front end of the bar workpiece 30.

The bar workpiece 30 is now gripped by both the first headstock 4 and the second headstock 5. Then, the first spindle 29 of the first headstock 4 rotates the bar workpiece 30 about its own axis. Thereafter, the tool 7 on the first tool rest 10 or the tool 6 on the second tool rest 11 cuts into the bar workpiece 30 and cuts off a workpiece 8 from the bar workpiece 30. When the bar workpiece 30 is thus cut off, the severed workpiece 8 is separated from the first headstock 4 and is transferred to the second headstock 5.

Figure 7C:
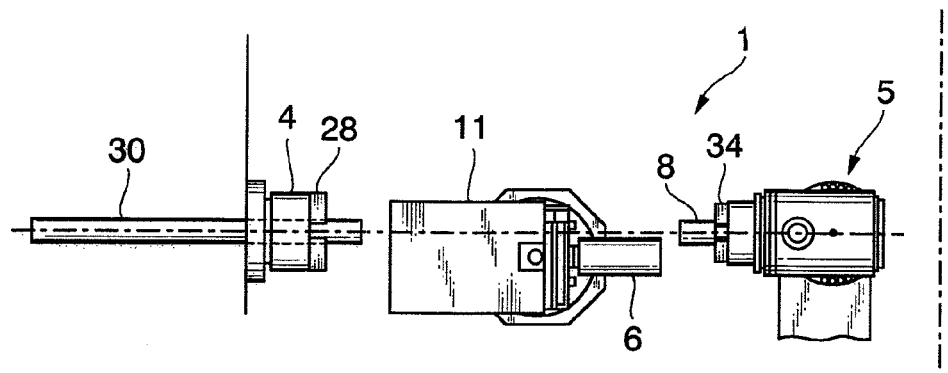

Then, as shown in FIG. 7C, the second headstock 5 is moved to the right, leaving a space on the left side of the second headstock 5 on which one end, i.e., a right end, of the workpiece 8 is gripped by the second chuck 34.

The other end, i.e., the left end, of the workpiece 8 is then machined in the space. Specifically, as the second headstock 5 has no actuator for rotating the workpiece 8, the presser 58 of the lock means 56 is pushed in to keep the second spindle 35 nonrotatable. The workpiece 8 which is gripped by the second chuck 34 of the second headstock 5 is also kept non-rotatable. The tool 6 on the second tool rest 11 is then rotated to perform a cutting operation on the other end, i.e., the left end, of the workpiece 8.

The bar feeder which is combined with the first headstock 4 is operated to push the bar workpiece 30 to the right, and an end portion of the bar workpiece 30 which projects from the first spindle 29 is gripped by the first chuck 28. The bar workpiece 30 is then machined by the tool 6 on the second tool rest 11 or the tool 7 on the first tool rest 10, as described above.

Figure 7D:
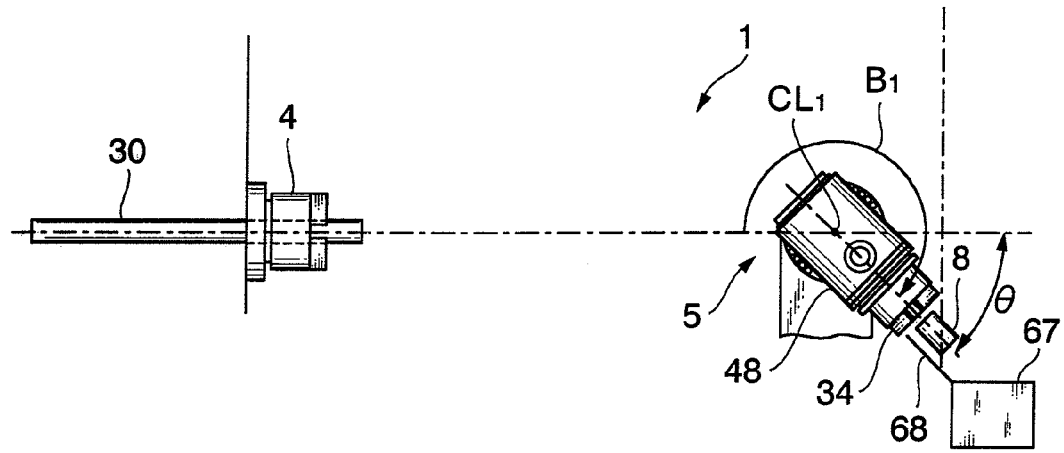

Subsequently, as shown in FIG. 7D, the swivel unit 48 of the second headstock 5 is swiveled to position the machined workpiece 8 over a chute 68. The chute 68 is mounted on or disposed near the machine body 2 and extends to a feed conveyor 67.

The chute 68 has a guide surface which is inclined downwardly at an angle θ to the horizontal plane. If the angle θ is of 45 degrees, then the swiveling unit 48 is clockwise swiveled 225 degrees about the central axis CL1 from the angular position shown in FIG. 7C to the angular position shown in FIG. 7D.

After the swiveling unit 48 is swiveled about the central axis CL1 to position the workpiece 8 over the chute 68, the second chuck 34 unclamps the workpiece 8, which is released from the second chuck 34 and is guided down the chute 68 onto the feed conveyor 67. At this time, the workpiece 8 is ejected by gravity obliquely downwardly from the multi-axis turning center 1.

As described above, the multi-axis turning center 1 machines the workpiece 8 successively at opposite axial ends thereof. Thereafter, the machined workpiece 8 is displaced by gravity obliquely downwardly down the chute 68 without causing damage to itself. Specifically, the machined workpiece 8 is displaced by gravity obliquely downwardly along the guide surface which is inclined at the angle θ to the horizontal plane. The machined workpiece 8 is thus smoothly ejected from the multi-axis turning center 1 without causing damage to itself.

The feed conveyor 67 may be replaced with a setup table. If the setup table is used in place of the feed conveyor 67, the machined workpiece 8 which is ejected down the chute 68 is discharged onto the setup table and will be carried away by the operator.

A lathe 1a according to a modification of the first embodiment will be described below with reference to FIGS. 8A through 8D.

FIGS. 8A through 8D are front elevational views showing a procedure from machining both ends of a workpiece with the lathe 1a to ejecting the workpiece 8 from the lathe 1a. The lathe 1a is similar to the multi-axis turning center 1 according to the first embodiment, except that the lathe 1a is free of the second tool rest 11 and its actuator.

As shown in FIGS. 2 through 6 and FIGS. 8A through 8D, the lathe 1a serves as a machine tool for turning operation. The lathe 1a comprises a machine body 2, a first tool rest 10 movably mounted on the machine body 2 as a tool rest means for holding a tool, such as a tool 7, a first headstock 4 mounted on the machine body 2, for holding a workpiece 8 rotatably thereon, and a second headstock 5 movably mounted on the machine body 2 in confronting relation to the first headstock 4, for holding a workpiece 8 rotatably thereon. The lathe 1a performs a turning operation on the workpiece 8.

The second headstock 5 is capable of swiveling about a central axis CL1 which extends parallel to the Y-axis direction, i.e., which extends horizontally. The first tool rest 10 which serves as the tool rest means 3 has a turret 9 on which a plurality of tools 7, 7a are mounted for turning operations and for machining the workpiece 8.

Since the lathe 1a is free of the second tool rest 11 of the multi-axis turning center 1 according to the first embodiment, the first tool rest 10 is disposed in a given position in the machining area SP.

A procedure from machining both ends of a workpiece 8 with the lathe 1a to ejecting the workpiece 8 from the lathe 1a will be described below with reference to FIGS. 8A through 8D.

Figure 8A:
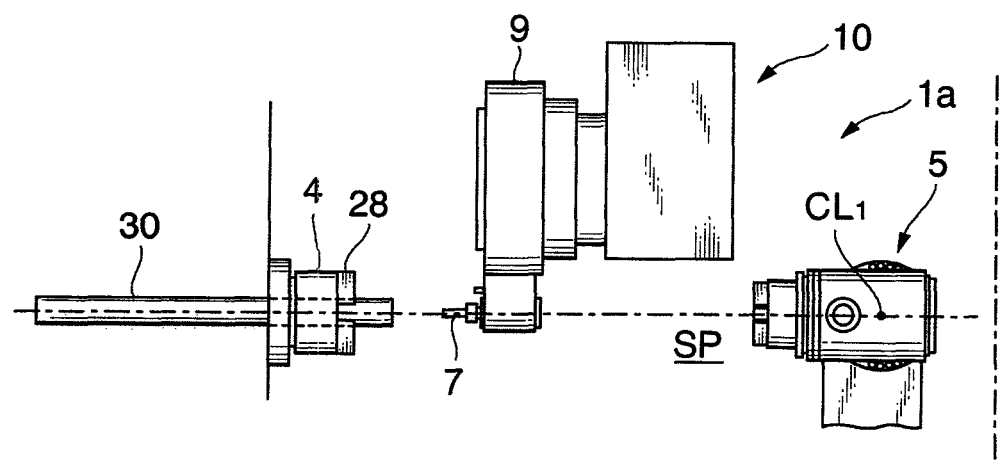
FIGS. 8A through 8D are front elevational views showing a procedure from machining both ends of a workpiece with a lathe according to a modification of the first embodiment to ejecting the workpiece from the lathe.

As shown in FIG. 8A, a bar workpiece 30 is gripped by the first chuck 28 of the first headstock 4 and rotated about its own axis. The tool 7 on the first tool rest 10 then performs a turning operation on the bar workpiece 30. If the tool 7 on the first tool rest 10 is a rotating tool, then the bar workpiece 30 is rendered nonrotatable and the rotating tool 7 performs a cutting operation on the bar workpiece 30.

One axial end, i.e., a right end, of the bar workpiece 30 is thus machined by the tool 7 in the cutting operation or the turning operation.

Figure 8B:
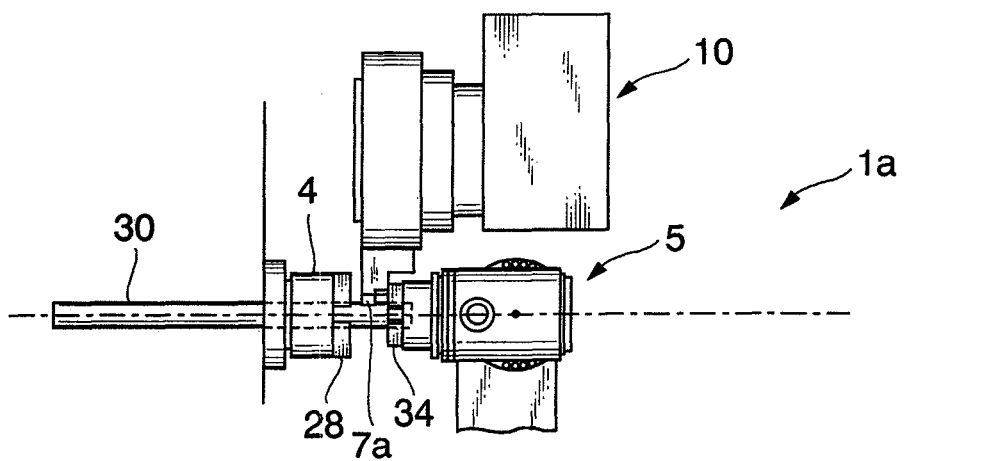

Then, as shown in FIG. 8B, the second headstock 5 is moved to the left, and the second chuck 34 of the second headstock 5 grips the machined end of the bar workpiece 30. The first headstock 4 then rotates the bar workpiece 30 about its own axis.

Thereafter, the tool 7a for the turning operation on the first tool rest 10 cuts into the bar workpiece 30 and cuts off the workpiece 8 from the bar workpiece 30. When the bar workpiece 30 is thus cut, the severed workpiece 8 is separated from the first headstock 4 and is transferred to the second headstock 5.

Figure 8C:
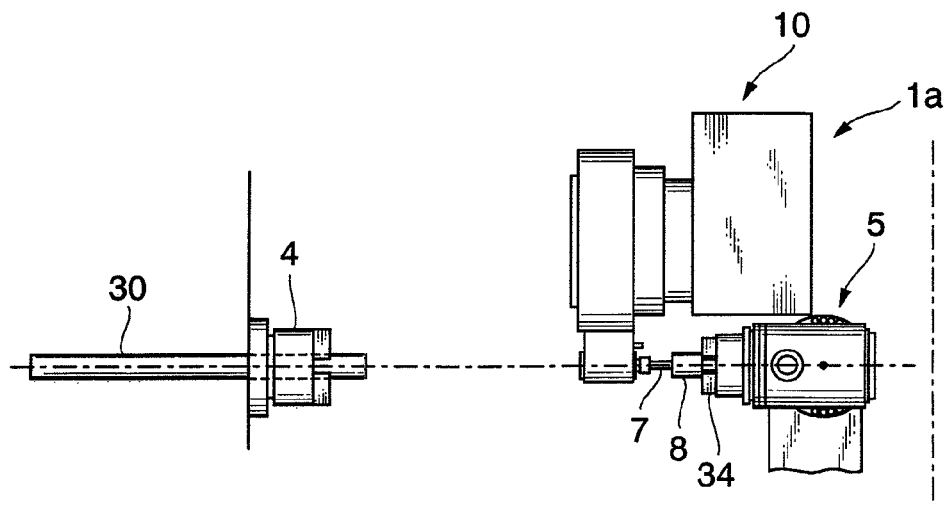

Then, as shown in FIG. 8C, the second headstock 5 on which one end, i.e., a right end, of the workpiece 8 is gripped by the second chuck 34 is moved to the right. The lock means 56 locks the workpiece 8 against rotation, and thereafter the tool 6 on the second tool rest 11 or the tool 7 on the first tool rest 10 performs the cutting operation on the other end, i.e., a left end, of the workpiece 8.

Figure 8D:
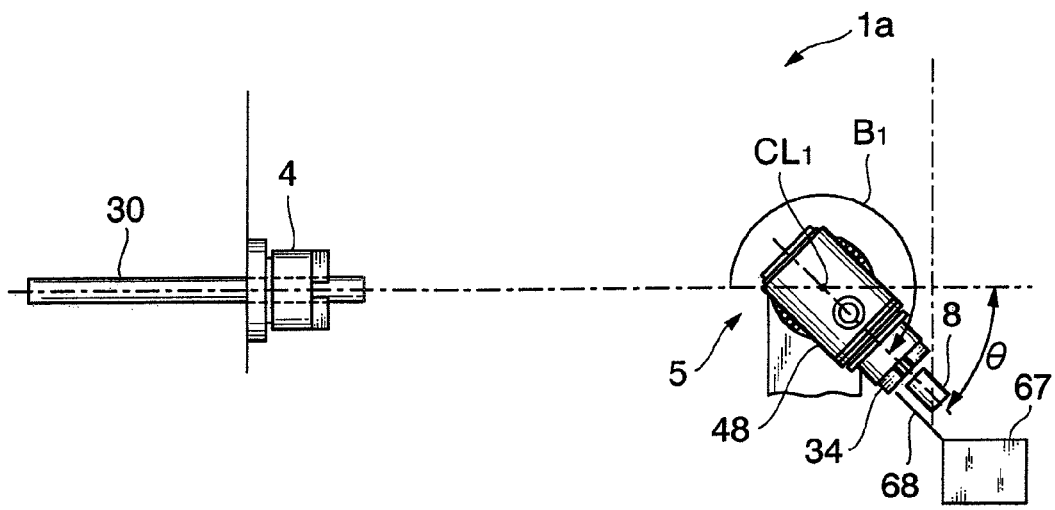

As shown in FIG. 8D, the swiveling unit 48 of the second headstock 5 is clockwise swiveled to position the machined workpiece 8 over the chute 68. The second chuck 34 unclamps the workpiece 8, which is released from the second chuck 34 and is guided down the chute 68 onto the feed conveyor 67.

As described above, the lathe 1a machines the workpiece 8 successively at opposite axial ends thereof. Thereafter, the machined workpiece 8 is displaced by gravity obliquely downwardly down the chute 68 without causing damage to itself, and hence is smoothly ejected from the lathe 1a without causing damage to itself. Therefore, the lathe 1a offers the same advantages as the multi-axis turning center 1.

Second Embodiment

Figure 9:
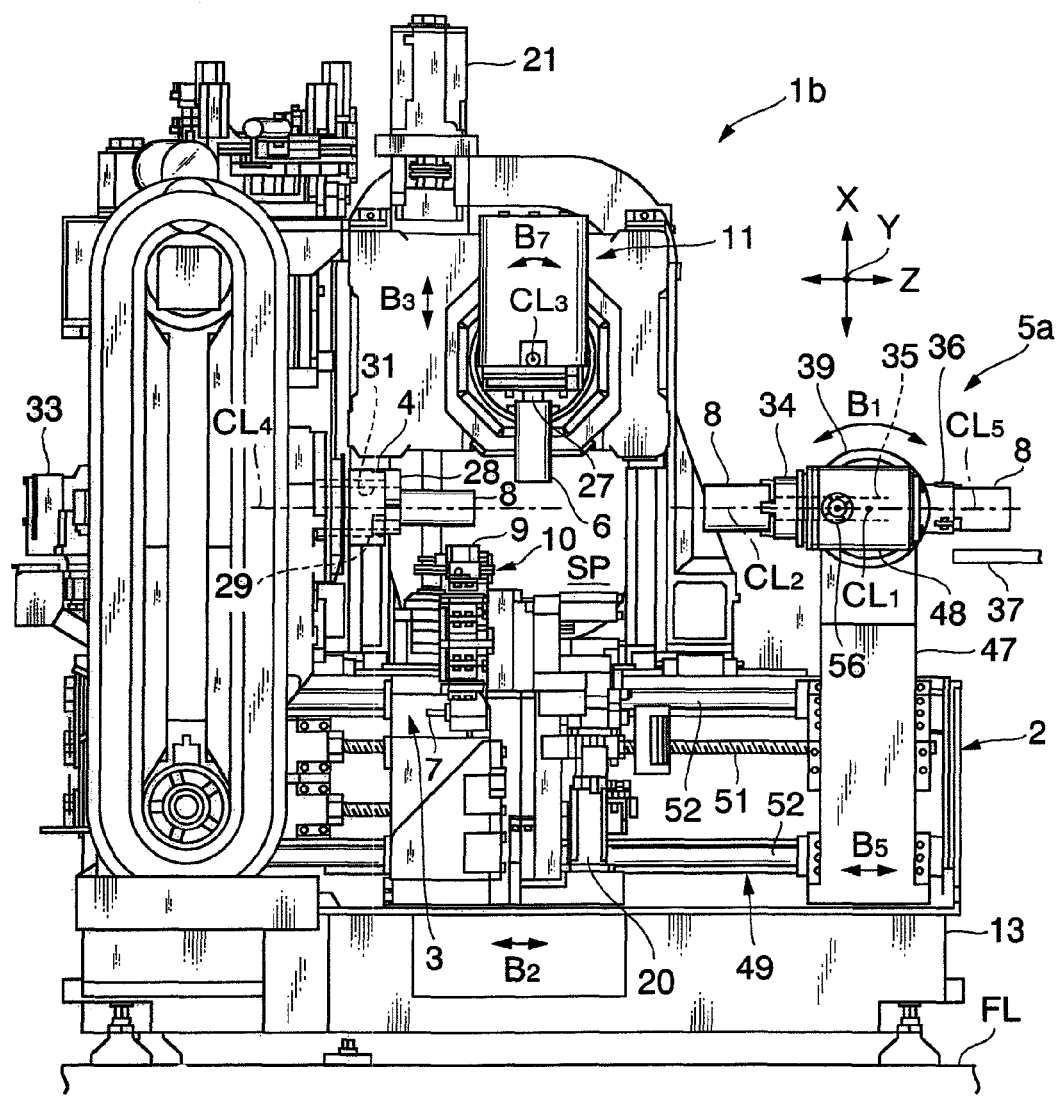
FIG. 9 is a front elevational view of a multi-axis turning center as a machine tool according to a second embodiment of the present invention.
Figure 10:
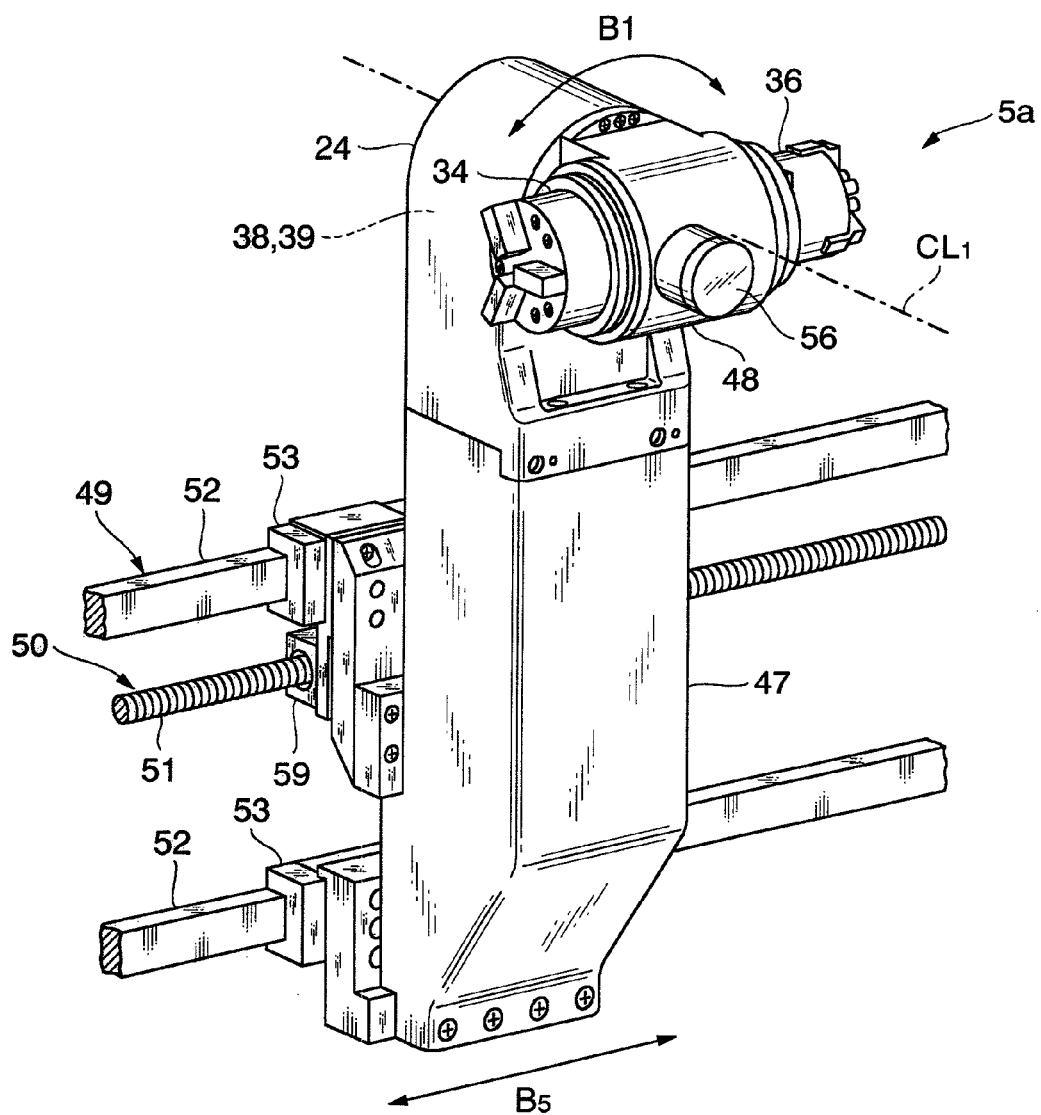
FIG. 10 is a perspective view, similar to FIG. 5, of a second headstock of the multi-axis turning center shown in FIG. 9.
Figure 11A:
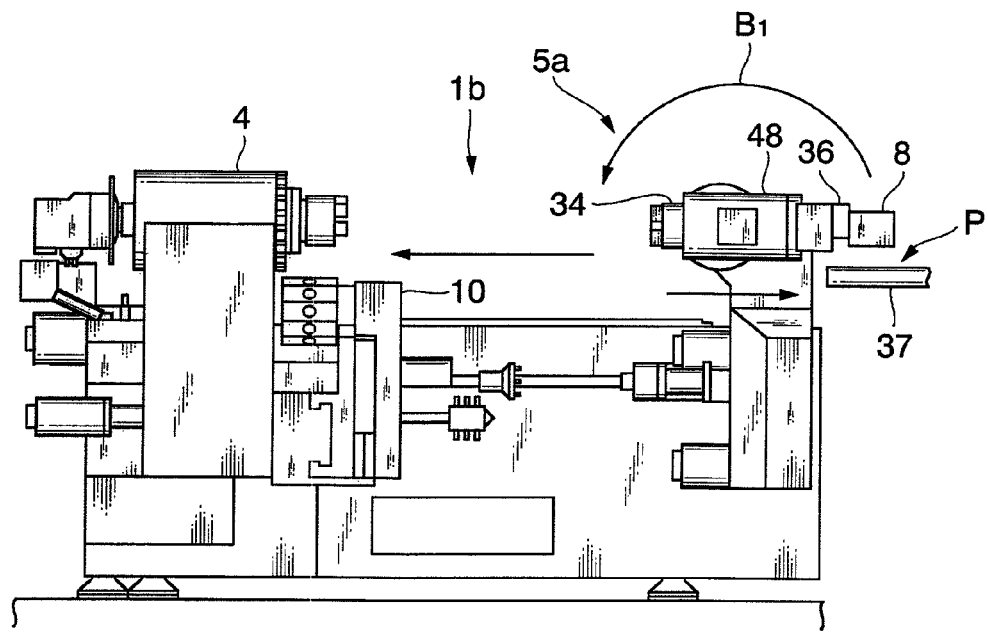
FIGS. 11A through 11D are front elevational views showing a procedure from machining both ends of a workpiece with the multi-axis turning center shown in FIG. 9 to ejecting the workpiece from the multi-axis turning center.
Figure 11B:
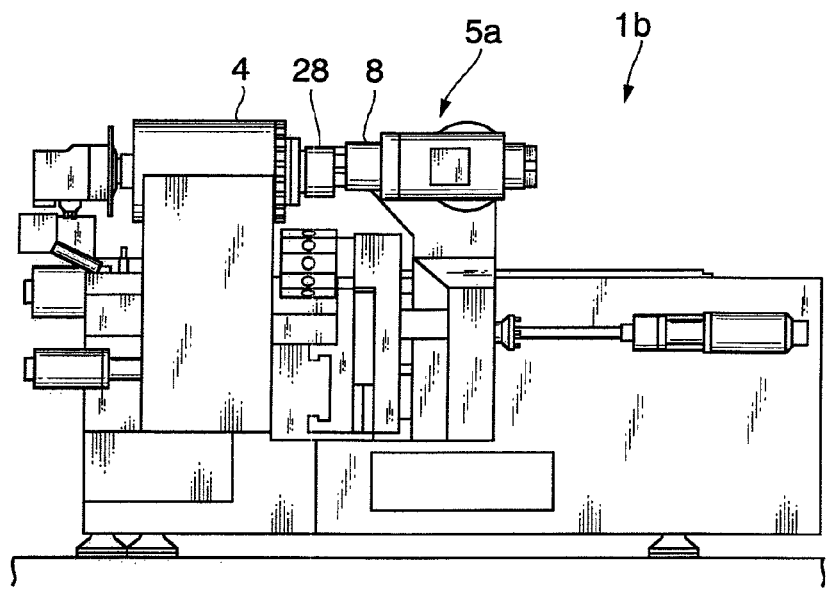
Figure 11C:
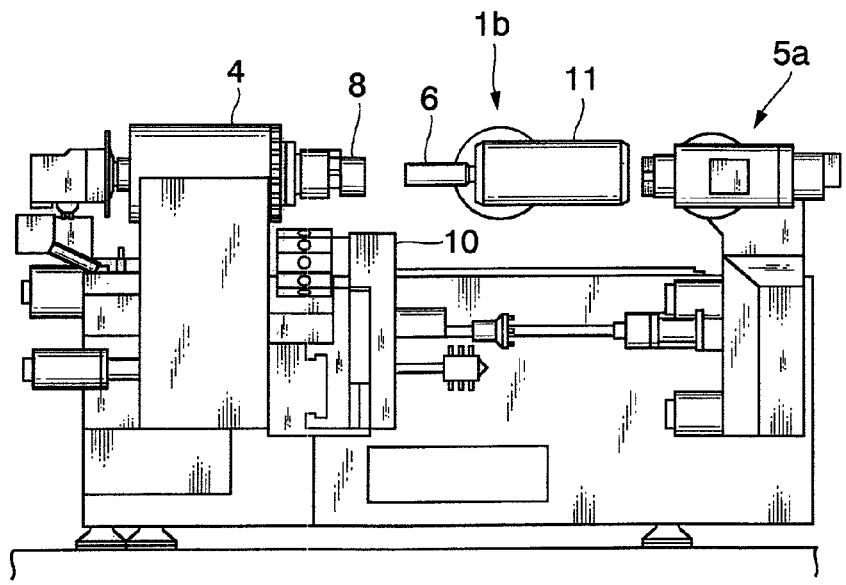
Figure 11D:
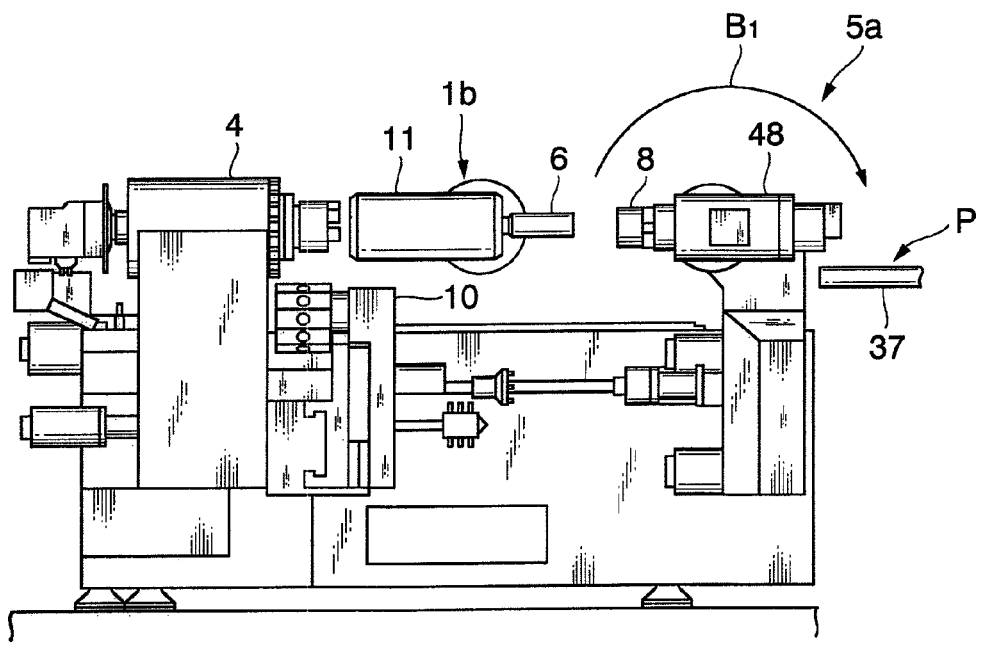
Figure 12:
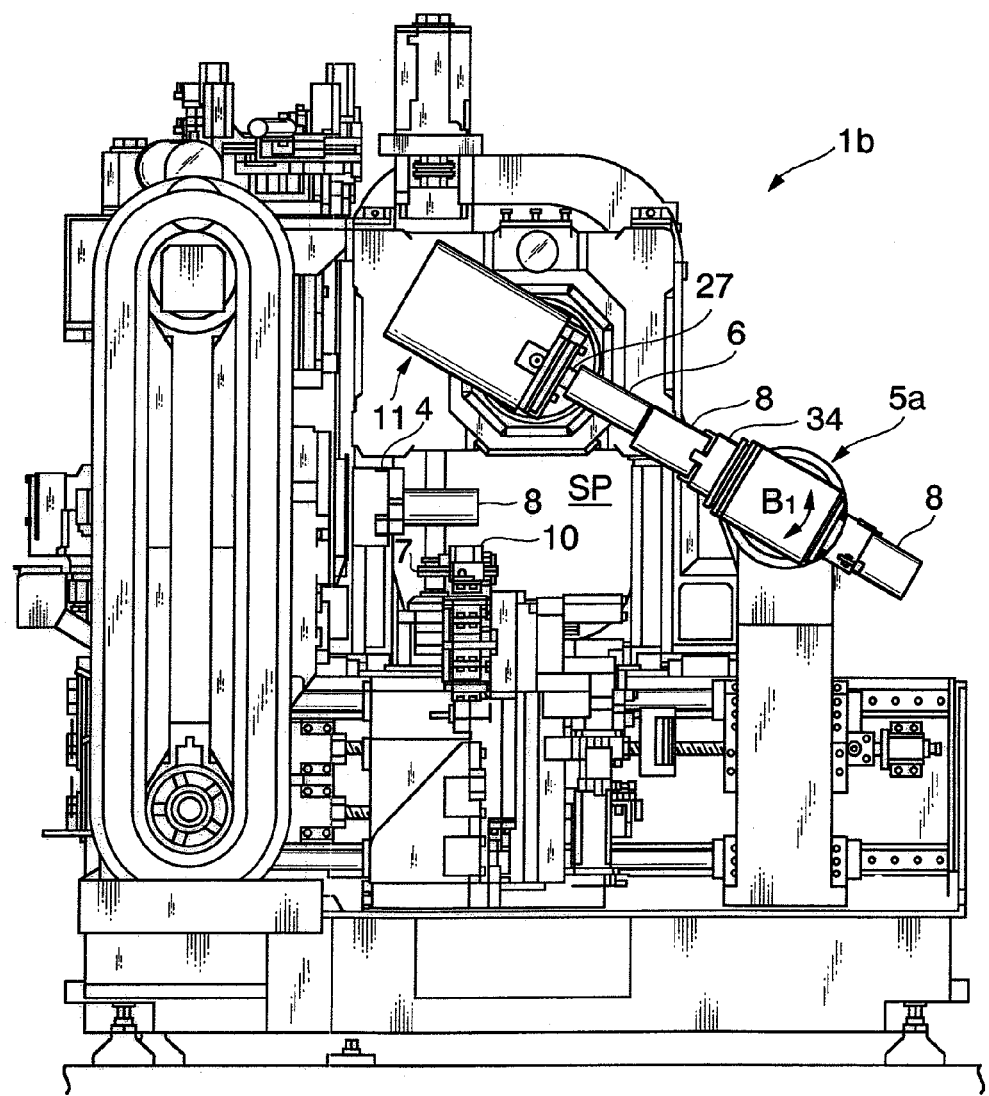
FIG. 12 is a front elevational view, similar to FIG. 4, of the multi-axis turning center shown in FIG. 9, showing the manner in which the multi-axis turning center is machining two workpieces simultaneously.

FIGS. 9 through 16 show a second embodiment of the present invention and modifications thereof. FIG. 9 is a front elevational view of a multi-axis turning center 1b as a machine tool according to a second embodiment of the present invention, FIG. 10 is a perspective view, similar to FIG. 5, of a second headstock 5a of the multi-axis turning center 1*b*, FIGS. 11A through 11D are front elevational views showing a procedure from machining both ends of a workpiece with the multi-axis turning center 1*b* to ejecting the workpiece from the multi-axis turning center 1*b*, and FIG. 12 is a front elevational view, similar to FIG. 4, of the multi-axis turning center 1*b*, showing the manner in which the multi-axis turning center 1*b* is machining two workpieces 8 simultaneously.

As shown in FIGS. 9 through 12, the multi-axis turning center 1*b* which serves as a machine tool for turning operations is of substantially the same structure as the multi-axis turning center 1 according to the first embodiment, except that the second headstock incorporates a rear chuck.

The multi-axis turning center 1*b* has a machine body 2, a tool rest means 3 movably mounted on the machine body 2, for holding tools 6, 7, a first headstock 4 mounted on the machine body 2, for holding the workpiece 8 rotatably thereon, and a second headstock 5*a* movably mounted on the machine body 2 in confronting relation to the first headstock 4, for holding the workpiece 8 rotatably thereon. The multi-axis turning center 1*b* performs at least turning operations.

The second headstock 5*a* includes a second chuck 34 as a front chuck and a third chuck 36 as the rear chuck which is disposed opposite to the second chuck 34. The second headstock 5*a* performs a workpiece changing function by swiveling about the central axis CL1 which extends parallel to the Y-axis direction, i.e., which extends horizontally or obliquely.

The second chuck 34 is disposed on a front side of the second headstock 5*a* along the central axis CL5 and grips the workpiece 8 detachably. The third chuck 36 is disposed on a rear side of the second headstock 5*a* along the central axis CL5 and grips the workpiece 8 detachably. The third chuck 36 is actuated by a third chuck actuator 39 in the second headstock 5*a* for selectively gripping and releasing the workpiece 8.

The central axis CL5 of the second spindle 35 and the central axis CL1 of the swivel unit 48 extend perpendicularly to each other. Consequently, a rotating movement of the second spindle 35 and a swiveling movement of the swiveling unit 48 are stabilized.

The tool rest means 3 comprises a first tool rest 10 having a turret 9 with a plurality of tools 7 mounted thereon for machining the workpiece, e.g., performing a turning operation on a workpiece, and a second tool rest 11 with a tool 6 detachably mounted on a tool spindle 27 for machining the workpiece, e.g., performing a cutting operation.

As shown in FIG. 12, while the workpiece 8 is being machined by the first headstock 4 and the first tool rest 10, the front chuck 34 of the second headstock 5*a* and the tool spindle 27 of the second tool rest 11 are oriented obliquely out of physical interference with at least one of the first headstock 4, the first tool rest 10 and the workpiece 8 which is being machined by the first headstock 4 and the first tool rest 10.

At this time, another workpiece 8 is machined by the second headstock 5*a* and the second tool rest 11. Consequently, the multi-axis turning center 1*b* is capable of machining two workpieces 8 simultaneously.

The multi-axis turning center 1*b* also includes a workpiece transfer unit 37 for changing a machined workpiece with a non-machined workpiece to the second headstock 5*a*. Specifically, the workpiece transfer unit 37 supplies the non-machined workpiece to a workpiece change position P (see FIG. 11A) which is outside of the machining area SP, and removes the machined workpiece ejected to the workpiece change position P.

The second headstock 5*a* grips the non-machined workpiece supplied to the workpiece change position P and thereafter places the machined workpiece in the workpiece change position R The second headstock 5*a* can thus perform a workpiece changing function.

The multi-axis turning center 1*b* can automatically change the workpieces 8 by itself while it is performing a machining process, without the need for a workpiece changer. As a result, the machining process performed by the multi-axis turning center 1*b* does not need to be interrupted for changing the workpieces. Therefore, the multi-axis turning center 1*b* has a high utilization ratio and serves as a labor saver.

Since the second headstock 5*a* performs the workpiece changing function, the operator does not need to attend the multi-axis turning center 1*b* at all times, and hence the multi-axis turning center 1*b* serves as a labor saver.

A procedure of machining both ends of the workpiece 8 with the multi-axis turning center 1*b* will be described below with reference to FIGS. 11A through 11D.

As shown in FIG. 11A, the workpiece transfer unit 37 supplies a non-machined workpiece 8 to the workpiece change position P. Then, the second headstock 5*a* is moved to the right, and the third chuck 36 thereof grips the non-machined workpiece 8.

Then, the swiveling unit 48 of the second headstock 5*a* is swiveled 180 degrees counterclockwise as indicated by the arrow B1. The third chuck 36 and the non-machined workpiece 8 gripped thereby now confront the first headstock 4. Then, the second headstock 5*a* is moved to the left.

As shown in FIG. 11B, the non-machined workpiece 8 gripped by the third chuck 36 engages the first chuck 28 of the first headstock 4. After the first chuck 28 grips the non-machined workpiece 8, the third chuck 36 unclamps the non-machined workpiece 8. The non-machined workpiece 8 is now released from the second headstock 5*a* and is transferred to the first headstock 4.

Then, as shown in FIG. 11C, the workpiece 8 supported by the first headstock 4 is machined by one or both of the tools on the first tool rest 10 and the second tool rest 11. One axial end, i.e., a right end, of the workpiece 8 is thus machined.

Subsequently, as shown in FIG. 11D, the second headstock 5*a* is moved to the left, and the workpiece 8 is transferred from the first headstock 4 to the second headstock 5*a*. The workpiece 8 which is gripped by the second chuck 34 of the second headstock 5*a* is machined by one or both of the tools on the first tool rest 10 and the second tool rest 11. The other axial end, i.e., a left end, of the workpiece 8 is thus machined.

When the workpiece 8 has fully been machined, the swiveling unit 48 of the second headstock 5*a* is swiveled clockwise as indicated by the arrow B1. The machined workpiece 8 is released from the second headstock 5*a* and is placed in the workpiece change position P of the workpiece transfer unit 37.

While the multi-axis turning center 1*b* is performing the machining process, the workpiece transfer unit 37 removes the machined workpiece 8 ejected to the workpiece change position P and supplies a next non-machined workpiece to the workpiece change position P.

The workpiece transfer unit 37 repeats the above operation to successively supply the non-machined workpieces 8 to the second headstock 5*a* and to successively eject the machined workpieces 8 from the second headstock 5*a*.

Since the swivel unit 48 of the second headstock 5*a* is angularly movable as indicated by the arrow B1, as shown in FIG. 12, a workpiece 8 gripped by the second headstock 5*a* can be machined by the tool on the second tool rest 11 while at the same time another workpiece 8 gripped by the first headstock 4 is being machined by the tool on the first tool rest 10. In this manner, the multi-axis turning center 1b can machine two workpieces 8 simultaneously.

A lathe 1c according to a modification of the second embodiment will be described below with reference to FIG. 13, FIGS. 14(A) through 14(I) and FIGS. 15(J) through 15(Q).

Figure 13:
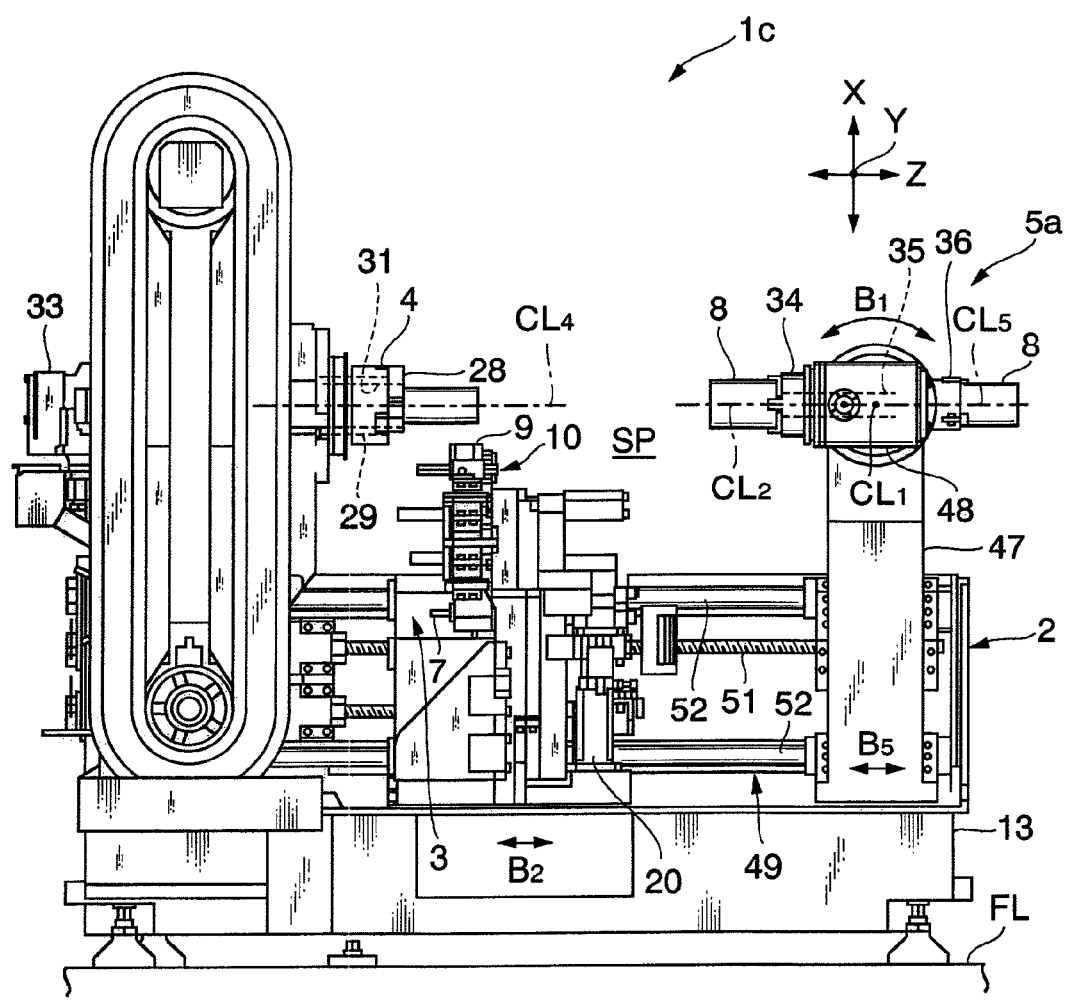
FIG. 13 is a front elevational view of a lathe according to a modification of the second embodiment.
Figure 14:
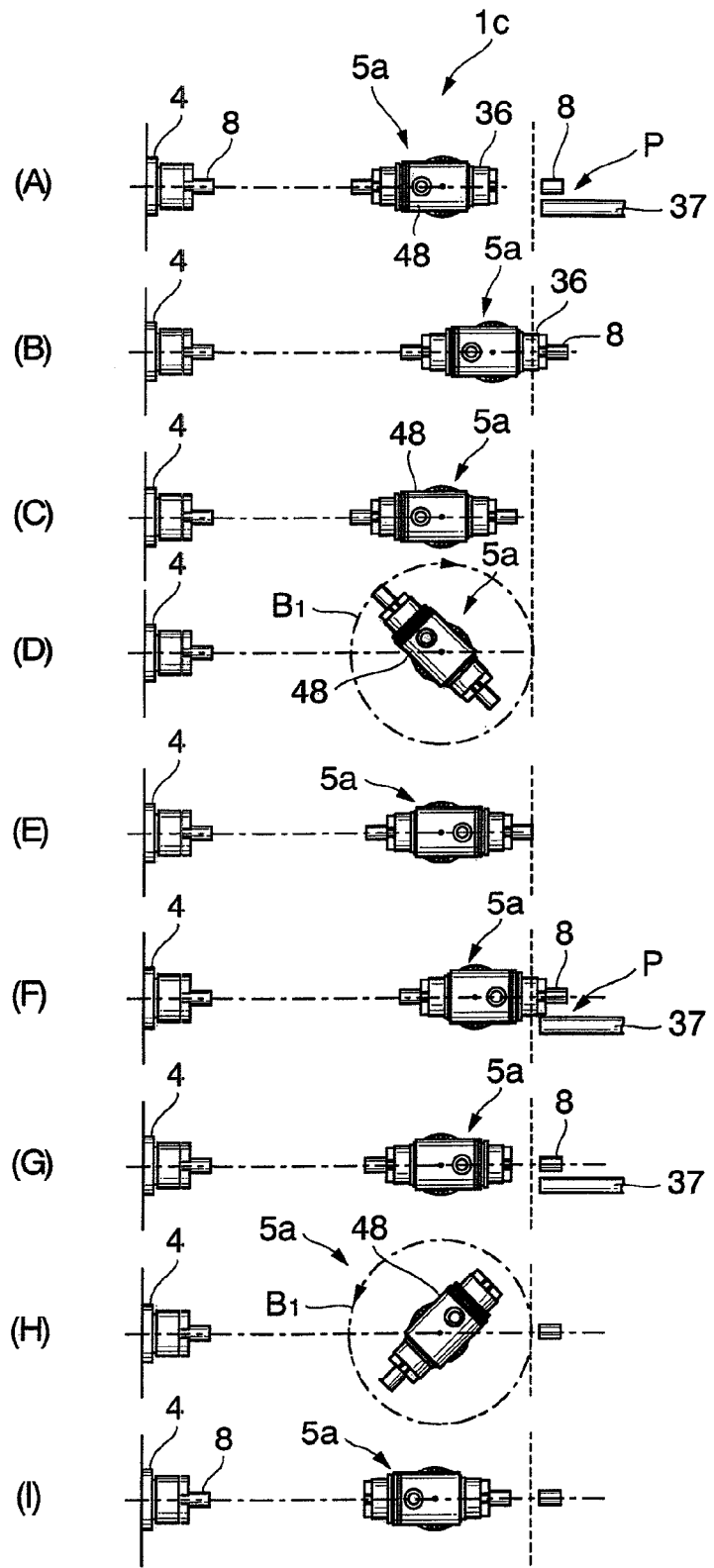
FIGS. 14(A) through 14(I) and FIGS. 15(J) through 15(Q) are front elevational views showing a process of loading, machining and unloading a workpiece on the lathe shown in FIG. 13.
Figure 15:
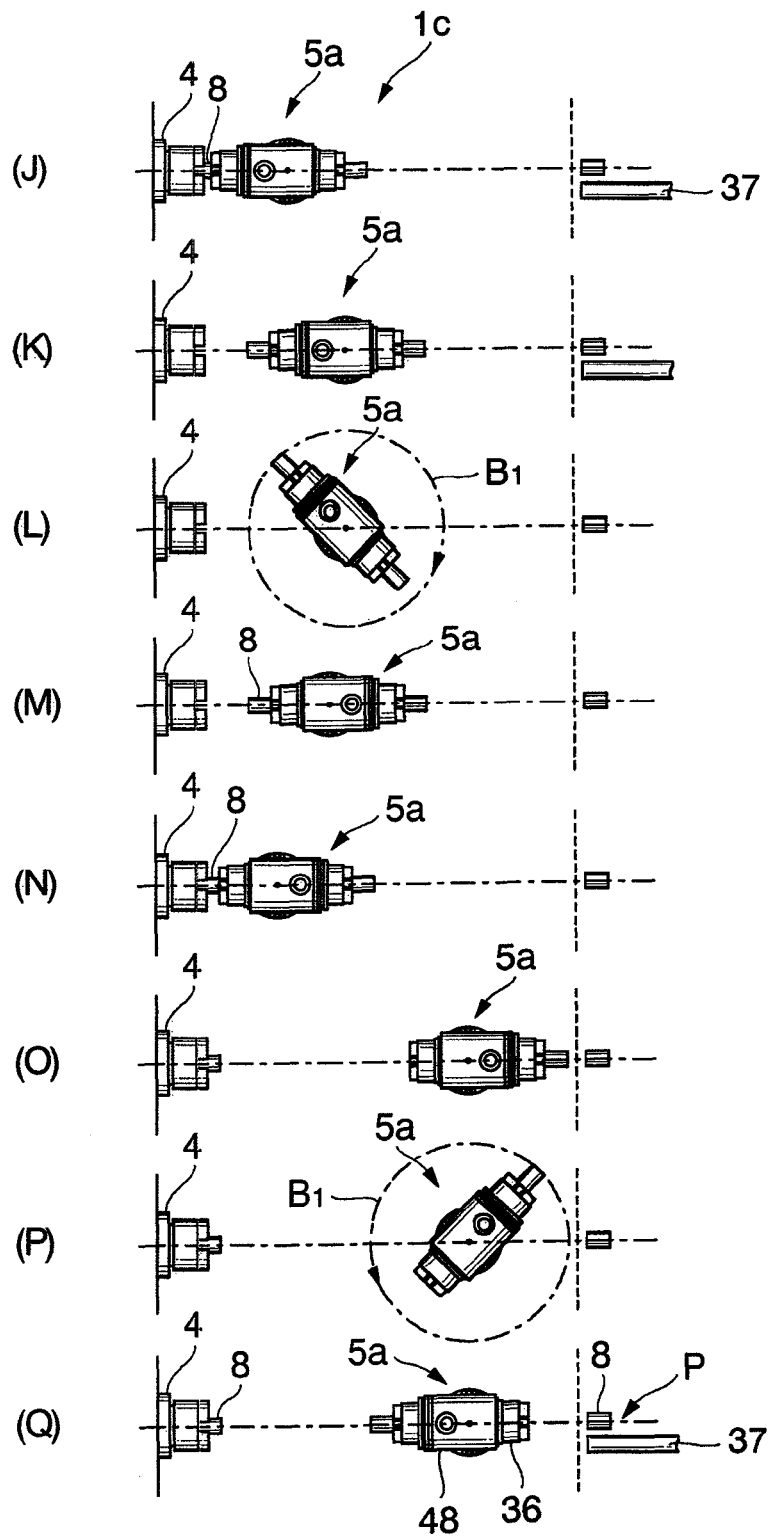

FIG. 13 is a front elevational view of the lathe 1c, and FIGS. 14(A) through 14(I) and FIGS. 15(J) through 15(Q) are front elevational views showing a process of loading, machining and unloading a workpiece 8 on the lathe 1c.

According to the modification, the lathe 1c which serves as a machine tool for turning operations is free of the second tool rest 11 and its actuator of the multi-axis turning center 1b. The other details of the lathe 1c are identical to those of the multi-axis turning center 1b. Since the lathe 1c is free of the second tool rest 11, the first tool rest 10 is disposed in a given position in the machining area SP.

The lathe 1c comprises a machine body 2, a first tool rest 10 (or a plurality of first tool rests 10) movably mounted on the machine body 2 as a tool rest means for holding tools, such as a tool 7, a first headstock 4 mounted on the machine body 2, for holding a workpiece 8 rotatably thereon, and a second headstock 5a movably mounted on the machine body 2 in confronting relation to the first headstock 4, for holding a workpiece 8 rotatably thereon. The lathe 1c carries out at least turning operations on the workpiece 8.

The first tool rest 10 has a turret 9 with a plurality of tools 7 mounted thereon for machining the workpiece 8, e.g., for performing a turning operation on the workpiece 8. The second headstock 5a is identical in structure and function to the second headstock 5a of the multi-axis turning center 1b.

A process of loading, machining and unloading the workpiece 8 on the lathe 1c will be described below with reference to FIGS. 14(A) through 14(I) and FIGS. 15(J) through 15(Q).

First, as shown in FIG. 14(A), the workpiece transfer unit 37 supplies a non-machined workpiece 8 to the workpiece change position P which is outside of the machining area SP. At this time, the second headstock 5a is disposed in a position near the workpiece change position P, with the third chuck 36 facing in the direction of the workpiece change position P.

Then, as shown in FIG. 14(B), the second headstock 5a is moved to the right. After the third chuck 36 grips the non-machined workpiece 8 in the workpiece change position P, the second headstock 5a is moved to the left (see FIG. 14(C)).

Then, as shown in FIG. 14(D), the swiveling unit 48 of the second headstock 5a is swiveled 180 degrees in a vertical plane. As shown in FIGS. 14(E) and 14(F), the second headstock 5a is moved to the right, and a machined workpiece 8 gripped by the second chuck 34 is placed in the workpiece change position P.

Thereafter, as shown in FIG. 14(G), the second headstock 5a is moved to the left away from the machined workpiece 8 in the workpiece change position P. Then, as shown in FIG. 14(H), the second headstock 5a is swiveled 180 degrees.

Subsequently, as shown in FIGS. 14(I) and 15(J), the second headstock 5a is moved to the left and reaches the first headstock 4. The second chuck 34 of the second headstock 5a grips a machined workpiece 8 which has been gripped by the first headstock 4. The machined workpiece 8 is now transferred from the first headstock 4 to the second headstock 5a.

Then, as shown in FIGS. 15(K) and 15(L), the second headstock 5a is moved to the right and thereafter is swiveled 180 degrees. As shown in FIGS. 15(M) and 15(N), the non-machined workpiece 8 gripped by the second headstock 5a is oriented toward the first headstock 4. The second headstock 5a is moved to the left. When the second headstock 5a reaches the first headstock 4, the second headstock 5a transfers the non-machined workpiece 8 to the first headstock 4.

Thereafter, as shown in FIGS. 15(O) and 15(P), the second headstock 5a is moved to the right and is swiveled 180 degrees. As shown in FIG. 15(Q), the second headstock 5a is positioned near the workpiece change position P, and the third chuck 36 faces in the direction of the workpiece change position P. The second headstock 5a is thus in the initial position shown in FIG. 14(A).

When the above process illustrated in FIGS. 14(A) through 14(I) and FIGS. 15(J) through 15(Q) is carried out, the second headstock 5a automatically changes workpieces 8 while the lathe 1a is performing its machining process, i.e., while the lathe 1a is machining the workpiece 8 gripped by the first headstock 4.

Consequently, the machining process performed by the lathe 1c does not need to be interrupted for changing workpieces 8. Therefore, the lathe 1c has a high utilization ratio, and does not require a workpiece changer.

The lathe 1c offers the same advantages as the multi-axis turning center 1b. Inasmuch as the second headstock 5a has the workpiece changing function and the lathe 1c has the workpiece transfer unit 37, the lathe 1c can operate as an unattended automatic machine tool.

Figure 16:
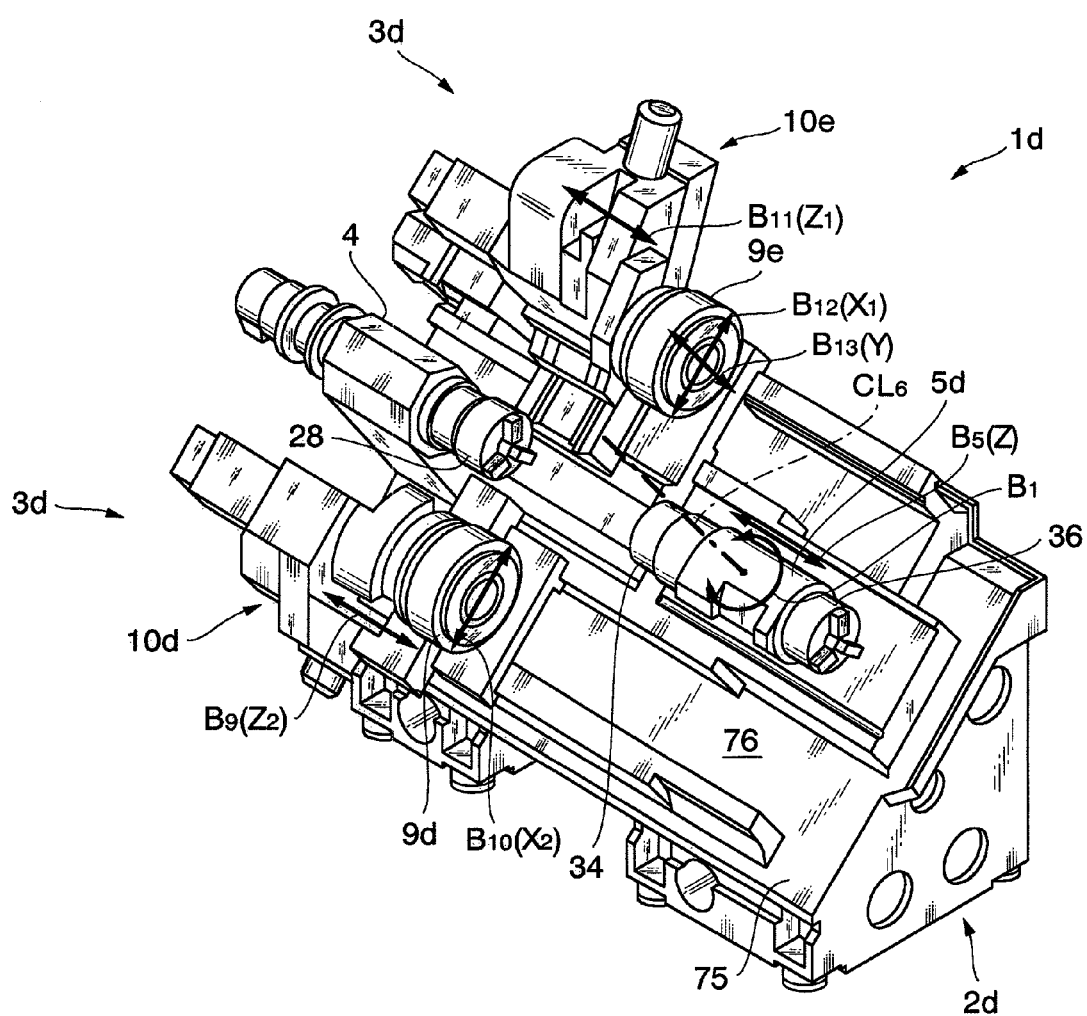
FIG. 16 is a perspective view of a lathe according to another modification of the second embodiment.

FIG. 16 is a perspective view of a lathe 1d according to another modification of the second embodiment. According to the modification shown in FIG. 16, the lathe 1d which serves as a machine tool for turning operation has a slanted bed 75. The lathe 1d is free of the second tool rest 11 and its actuator of the multi-axis turning center 1b.

The lathe 1d comprises a machine body 2d with the slanted bed 75, a tool rest means 3d movably mounted on the machine body 2d, for holding a tool, a first headstock 4 mounted on the machine body 2d, for holding a workpiece rotatably thereon, and a second headstock 5d. The lathe 1d performs at least turning operations.

The second headstock 5d is movably mounted on the machine body 2d in confronting relation to the first headstock 4, and holds a workpiece rotatably thereon. The second headstock 5d includes a front chuck 34 disposed on a front side of a central axis thereof for gripping the workpiece detachably thereon, and a rear chuck 36 disposed on a rear side of the central axis thereof for gripping the workpiece detachably thereon. The second headstock 5d performs a workpiece changing function by swiveling about a central axis CL6 which extends parallel to the Y-axis direction, i.e., which extends obliquely.

The tool rest means 3d has a plurality of (two in this modification) tool rests 10d, 10e. The tool rest 10d, which will also be referred to as a lower tool rest 10d, has a turret 9d with a plurality of tools for machining the workpiece. The tool rest 10e, which will also be referred to as an upper tool rest 10e, has a turret 9e with a plurality of tools for machining the workpiece. The tool rests 10d, 10e are disposed in respective given positions in the machining area.

The lower tool rest 10d is movable by a Z2-axis actuator in horizontal direction, i.e., Z2-axis direction, indicated by the arrow B9. The turret 9d is movable by a turret X2-axis actuator in oblique anteroposterior direction, i.e., X2-axis direction, along a slanted surface 76 of the bed 75 as indicated by the arrow B10. The turret 9d is also angularly movable by a swiveling actuator to index a desired tool to a desired index position.

The upper tool rest 10e is movable by a Z1-axis actuator in horizontal direction, i.e., Z1-axis direction, indicated by the arrow B11. The turret 9e is movable by a turret X1-axis actuator in oblique anteroposterior direction, i.e., X1-axis direction, along the slanted surface 76 of the bed 75 as indicated by the arrow B12.

The turret 9*e* is also movable by a turret Y-axis actuator in oblique vertical direction, i.e., Y-axis direction, perpendicular to the slanted surface 76 of the bed 75 as indicated by the arrow B13. The turret 9*e* is also angularly movable by a swiveling actuator to index a desired tool to a desired index position.

The second headstock 5*d* is movable by a second headstock actuator in the horizontal direction, i.e., the Z-axis direction, indicated by the arrow B5.

The central axis CL6 extends in the oblique vertical direction perpendicular to the slanted surface 76 of the bed 75, and is oriented parallel to the Y-axis direction. The second headstock 5*d* is angularly movable by a swiveling actuator through a desired angle about the central axis CL6 parallel to the Y-axis direction, as indicated by the arrow B1.

The lathe 1*d* with the slanted bed 75 should preferably be combined with the workpiece transfer unit 37 (see FIGS. 14 and 15) for changing a machined workpiece with a non-machined workpiece on the second headstock 5*d*.

The workpiece transfer unit 37 which is used in combination with the lathe 1*d* supplies the non-machined workpiece to a workpiece change position P which is outside of the machining area SP, and removes the machined workpiece ejected to the workpiece change position P. The second headstock 5*d* grips the non-machined workpiece supplied to the workpiece change position P and thereafter places the machined workpiece in the workpiece change position P.

Therefore, if the workpiece transfer unit 37 is used in combination with the lathe 1*d*, then workpieces 8 can be loaded, machined, and unloaded in the same fashion as the process illustrated in FIGS. 14(A) through 14(I) and FIGS. 15(J) through 15(Q). The lathe 1*d* coupled with the workpiece transfer unit 37 thus offers the same advantages as the lathe 1*c* shown in FIG. 13.

Machine tools for turning operations according to the related art have changed workpieces in the machining area thereof. Each time workpieces are to be changed, it has been customary for the operator to open and close the door of the splash guard and perform a setup process in preparation for changing the workpieces.

The setup process has been burdensome on the operator. When the door of the splash guard is opened, the coolant and chips in the machining area may possibly be scattered out of the machining area.

With the multi-axis turning center 1*b* and the lathes 1*c*, 1*d* according to the present invention, however, the workpiece change position P in which workpieces 8 are changed by the second headstock 5*a* or 5*d* is outside of the machine tool, i.e., outside of the machining area SP. As a result, any burden imposed on the operator for changing workpieces is relatively small, and the environment around the machine tool is kept clean.

With the multi-axis turning center 1*b* and the lathes 1*c*, 1*d* according to the present invention, the second headstock 5*a* or 5*d* has the second chuck (front chuck) 34 and the third chuck (rear chuck) 36.

Therefore, the first chuck 28 of the first headstock 4 and the second and third chucks 34, 36 of the second headstock 5*a* or 5*d* can grip workpieces 8, respectively. As a result, the multi-axis turning center 1*b* and the lathes 1*c*, 1*d* can grip three workpieces 8 simultaneously for machining and changing them.

If an actuator is added for rotating the second spindle 35 of the second headstock 5*a* or 5*d*, then the first tool rest 10 or the tool rest 10*d* or 10*e* can perform a turning operation on a workpiece 8 which is being rotated by the second spindle 35 of the second headstock 5*a* or 5*d*.

Workpieces 8 can thus be successively machined at axially opposite ends thereof, and the machined workpieces 8 can automatically ejected successively out of the machine tool.

The principles of the present invention are applicable to not only multi-axis turning centers and lathes, but also any machine tools for performing at least turning operations.

Although certain preferred embodiments of the present invention have been shown and described in detail, it should be understood that various changes and modifications may be made therein without departing from the scope of the appended claims.

What is claimed is:

1. A machine tool for performing at least turning operations, comprising:
   a machine body;
   a tool rest movably mounted on said machine body, to hold a tool;
   a first headstock mounted on said machine body, to rotatably hold a workpiece to rotate about a Z axis; and
   a second headstock movably mounted on said machine body in confronting relation to said first headstock, said second headstock to rotatably hold the workpiece to rotate about the Z axis; wherein
   said second headstock includes a front chuck, disposed on a front side of a central axis thereof, for detachably gripping the workpiece, and a rear chuck disposed on a rear side of said central axis thereof, for detachably gripping the workpiece, and
   said second headstock performs a front chuck-to-rear chuck changing function by swiveling about said central axis, the central axis extending parallel to a Y-axis direction, where
   said Y axis extends in a horizontal direction and is orthogonal to both the Z axis and to an X axis that extends in a vertical direction.

2. The machine tool according to claim 1,
   wherein said machine tool comprises a multi-axis turning center, and
   said tool rest comprises
   a first tool rest including a turret including a plurality of tools mounted thereon, for machining the workpiece, and
   a second tool rest including a tool detachably mounted on a tool spindle, for machining the workpiece.

3. The machine tool according to claim 1,
   wherein said machine tool comprises a lathe, and said tool rest comprises one or more tool rests having a turret with a plurality of tools mounted thereon, for machining the workpiece.

4. The machine tool according to claim 1, further comprising:
   a workpiece transfer unit for changing a machined workpiece with a non-machined workpiece on said second headstock;
   wherein said workpiece transfer unit supplies the non-machined workpiece to a workpiece change position which is outside of a machining area, and removes the machined workpiece ejected to said workpiece change position; and
   said second headstock grips the non-machined workpiece supplied to said workpiece change position and thereafter places the machined workpiece in said workpiece change position.

5. A machine tool for performing at least turning operations, comprising:
- a machine body;
- a tool rest movably mounted on said machine body, to hold a tool;
- a first headstock mounted on said machine body, to rotatably hold a workpiece to rotate about a Z axis; and
- a second headstock movably mounted on said machine body in confronting relation to said first headstock, said second headstock to rotatably hold the workpiece to rotate about the Z axis; and
- a multi-axis turning center;
- wherein said tool rest comprises
- a first tool rest including a turret including a plurality of tools mounted thereon, for machining the workpiece, and
- a second tool rest including a tool detachably mounted on a tool spindle, for machining the workpiece; and
- said second headstock is capable of swiveling about a central axis extending parallel to a Y-axis direction,
- wherein said Y axis extends in a horizontal direction and is orthogonal to both the Z axis and to an X axis that extends in a vertical direction.

6. The machine tool according to claim 5, wherein while the workpiece is being machined by said first headstock and said first tool rest, a front chuck of said second headstock and said tool spindle of said second tool rest are oriented obliquely out of physical interference with at least one of said first headstock, said first tool rest and said workpiece, and another workpiece is machined by said second headstock and said second tool rest.

* * * * *